US012665952B2

<table>
<tr><td>(12) <b>United States Patent</b><br>Tonesi et al.</td><td>(10) <b>Patent No.:</b>   <b>US 12,665,952 B2</b><br>(45) <b>Date of Patent:</b>   <b>Jun. 23, 2026</b></td></tr>
</table>

(54) DISCOVERY OF EDGE APPLICATION SERVER ACROSS NETWORKS

(71) Applicant: QUALCOMM Incorporated, San Diego, CA (US)

(72) Inventors: Dario Serafino Tonesi, San Diego, CA (US); Sunghoon Kim, San Diego, CA (US); Nishant Gupta, Bangalore (IN); Alan Soloway, Frederick, CO (US); Tom Chin, San Diego, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/708,443

(22) PCT Filed: Jan. 24, 2023

(86) PCT No.: PCT/US2023/061146
§ 371 (c)(1),
(2) Date: May 8, 2024

(87) PCT Pub. No.: WO2023/147295
PCT Pub. Date: Aug. 3, 2023

(65) Prior Publication Data
US 2025/0030774 A1    Jan. 23, 2025

(30) Foreign Application Priority Data

Jan. 28, 2022    (IN)  ............................. 202221004862

(51) Int. Cl.
   *H04L 67/51*      (2022.01)
   *H04L 67/56*      (2022.01)
(52) U.S. Cl.
   CPC .............. *H04L 67/51* (2022.05); *H04L 67/56* (2022.05)

(58) Field of Classification Search
None
See application file for complete search history.

(56) References Cited

U.S. PATENT DOCUMENTS

2022/0191009 A1*   6/2022   Losacco ................ H04L 9/0891
2022/0263788 A1*   8/2022   Lee ..................... H04L 61/4511
(Continued)

FOREIGN PATENT DOCUMENTS

CN      113114651 A      7/2021
CN      113691969 A   *   11/2021  .......... H04L 61/4511

OTHER PUBLICATIONS

International Search Report and Written Opinion—PCT/US2023/061146—ISA/EPO—Apr. 25, 2023.

*Primary Examiner* — Schquita D Goodwin
*Assistant Examiner* — Ishrat Rashid
(74) *Attorney, Agent, or Firm* — Harrity & Harrity, LLP \ Qualcomm

(57)        ABSTRACT

This disclosure provides systems, methods and apparatuses for discovery, by a user connected to a first network, of an edge application server (EAS) associated with a second network. In some aspects, techniques described herein provide a shared EAS discovery function (EASDF), which allows users connected to different home networks to discover EASs across a plurality of networks. Some techniques described herein provide communication between EASDFs of different networks. Thus, a user connected to a first network can discover an EAS of a second network, which enables sharing of EASs across networks. Furthermore, techniques described herein provide communication between a UE connected to a first network and an edge data network (EDN) (such as an EAS hosted by the EDN) of a second network, such as by establishing a connection
(Continued)

between a user plane function of the first network associated with the UE and a network entity of the second network.

30 Claims, 15 Drawing Sheets

(56)                    References Cited

U.S. PATENT DOCUMENTS

2022/0321475 A1 * 10/2022  Thiebaut ................. H04L 47/11
2023/0132454 A1 *  5/2023  Kim ...................... H04M 15/66
                                                    370/329

* cited by examiner

| Target DNS server address in the DNS query | DNS server address filter | Result |
|---|---|---|
| 11.123.456.777 | 11.123.* | Matched, select the EASDF of MNO 1, which corresponds to 11.123.* |
| 10.11.22.33 | *.*.22.33 | Matched, select the EASDF of MNO X, which corresponds to *.*.22.33 |

| Requested FQDN in the DNS query | FQDN filter | Result |
|---|---|---|
| MNO1.xrgaming.edge | Mno1.* | Matched, select the EASDF of MNO1 |
| MSG.ARevent.edge | MSG.AR.*.* | Matched, select the EASDF of MNO X, which is serving Madison Square Garden (where serving MNO isn't) |
| Battle.gamingX.edge.com | *.gamingX.edge* | Matched, serving MNO knows in which MNO 'gamingX' is running, so select the MNO's EASDF |
| Sandiego.shopping.electronics | | No match found, no proposed action required |
| Plmn009.edge.eagames.com | Plmn009.* | Matched, selects EASDF of PLMN009 |

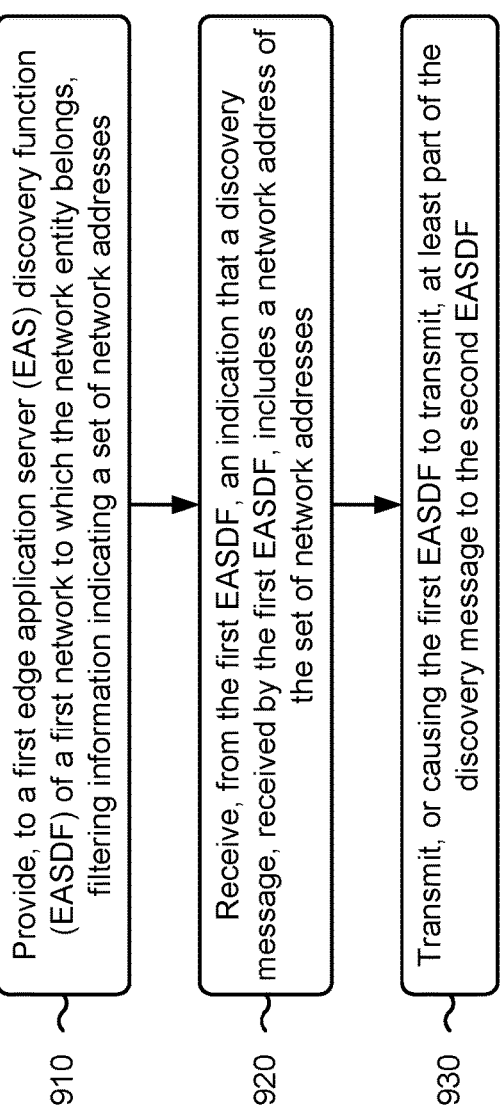

Provide, to a first edge application server (EAS) discovery function (EASDF) of a first network to which the network entity belongs, filtering information indicating a set of network addresses

910

Receive, from the first EASDF, an indication that a discovery message, received by the first EASDF, includes a network address of the set of network addresses

920

Transmit, or causing the first EASDF to transmit, at least part of the discovery message to the second EASDF

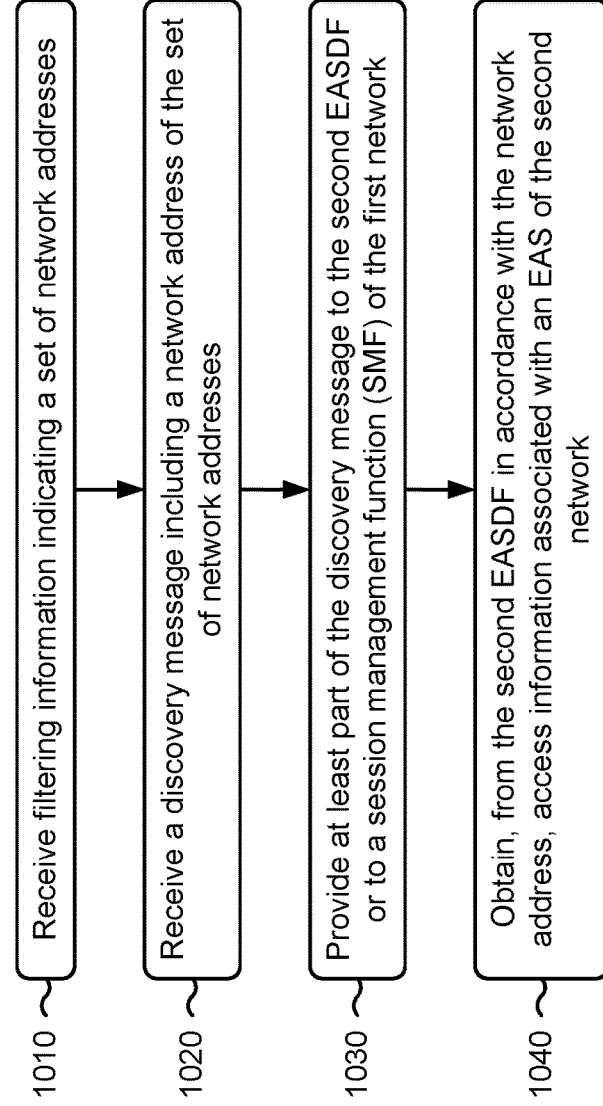

1010   Receive filtering information indicating a set of network addresses

1020   Receive a discovery message including a network address of the set of network addresses 1030   Provide at least part of the discovery message to the second EASDF or to a session management function (SMF) of the first network 1040   Obtain, from the second EASDF in accordance with the network address, access information associated with an EAS of the second network

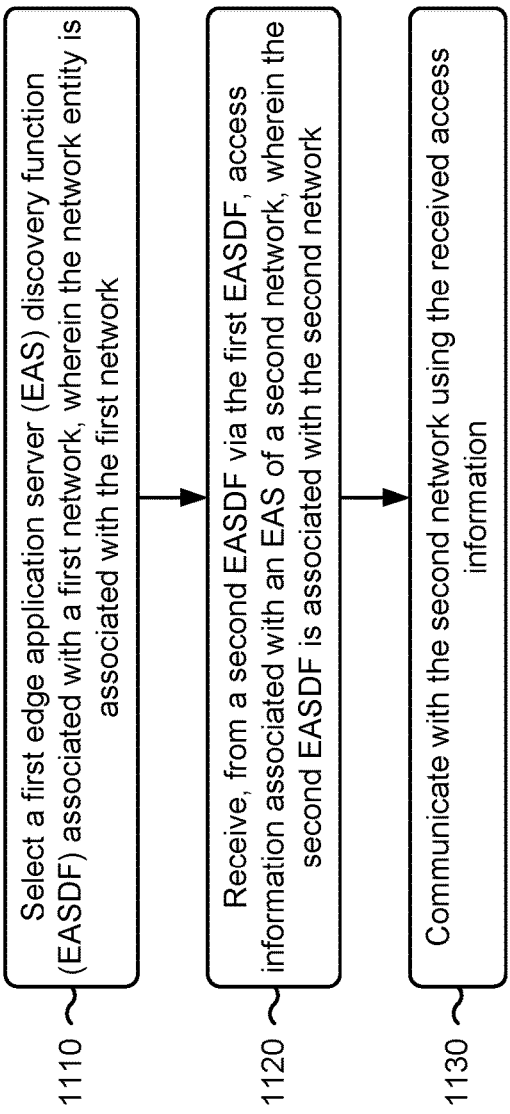

1100

1110 Select a first edge application server (EAS) discovery function (EASDF) associated with a first network, wherein the network entity is associated with the first network 1120 Receive, from a second EASDF via the first EASDF, access information associated with an EAS of a second network, wherein the second EASDF is associated with the second network 1130 Communicate with the second network using the received access information

FIGURE 11

1210  Select a unified data repository associated with a first network

1220  Transmit, to the unified data repository, edge application server (EAS) deployment information including at least one of a public land mobile network (PLMN) identifier associated with a second network having an EAS or filtering information indicating a network address associated with the EAS

1200

DISCOVERY OF EDGE APPLICATION SERVER ACROSS NETWORKS

CROSS-REFERENCE TO RELATED APPLICATION APPLICATIONS

This Patent Application is a 371 national stage of PCT Application No. PCT/US2023/061146, filed on Jan. 24, 2023, and entitled "DISCOVERY OF EDGE APPLICA- TION SERVER ACROSS NETWORKS," which claims priority to India patent application Ser. No. 20/222,1004862, filed on Jan. 28, 2022, entitled "DISCOVERY OF EDGE APPLICATION SERVER ACROSS NETWORKS," and assigned to the assignee hereof. The disclosures of the prior Applications are considered part of and are incorporated by reference into this Patent Application.

TECHNICAL FIELD

Aspects of the present disclosure relate generally to wireless communication and to techniques for discovery of an edge application server (EAS) across networks.

DESCRIPTION OF THE RELATED TECHNOLOGY

Wireless communication systems are widely deployed to provide various telecommunication services such as tele- phony, video, data, messaging, and broadcasts. Typical wireless communication systems may employ multiple- access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division syn- chronous code division multiple access (TD-SCDMA) sys- tems, and Long Term Evolution (LTE). LTE/LTE-Advanced is a set of enhancements to the Universal Mobile Telecom- munications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broad- band internet access by improving spectral efficiency, low- ering costs, improving services, making use of new spec- trum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a network entity. The method may include providing, to a first edge application server (EAS) discovery function (EASDF) of a first network to which the network entity belongs, filtering information indicating a set of network addresses. The method may include receiving, from the first EASDF, an indication that a discovery message, received by the first EASDF, includes a network address of the set of network addresses. The method may include transmitting, or causing the first EASDF to transmit, at least part of the discovery message to the second EASDF.

In some implementations, the method can include select- ing, in accordance with the indication, the second EASDF associated with at least the second network.

In some aspects, the discovery message is a domain name service query message.

In some aspects, the method can include receiving, from the second EASDF via the first EASDF, access information associated with an EAS of the second network; and estab- lishing a connection to the second network based at least in part on the access information.

Another innovative aspect of the subject matter described in this disclosure can be implemented in an apparatus of a network entity for wireless communication. The apparatus may include one or more interfaces configured to output, to a first EASDF of a first network to which the network entity belongs, filtering information indicating a set of network addresses; obtain, from the first EASDF, an indication that a discovery message, received by the first EASDF, includes a network address of the set of network addresses; and output, or cause the first EASDF to output, at least part of the discovery message to the second EASDF.

Another innovative aspect of the subject matter described in this disclosure can be implemented in a non-transitory computer-readable medium. The non-transitory computer- readable medium may store one or more instructions for wireless communication. The one or more instructions, when executed by one or more processors of a network entity, may cause the one or more processors to provide, to a first EASDF of a first network to which the network entity belongs, filtering information indicating a set of network addresses; receive, from the first EASDF, an indication that a discovery message, received by the first EASDF, includes a network address of the set of network addresses; and transmit, or causing the first EASDF to transmit, at least part of the discovery message to the second EASDF.

Another innovative aspect of the subject matter described in this disclosure can be implemented in an apparatus for wireless communication. The apparatus may include means for providing, to a first EASDF of a first network to which the network entity belongs, filtering information indicating a set of network addresses; means for receiving, from the first EASDF, an indication that a discovery message, received by the first EASDF, includes a network address of the set of network addresses; and means for transmitting, or causing the first EASDF to transmit, at least part of the discovery message to the second EASDF.

Another innovative aspect of the subject matter described in this disclosure can be implemented in a method of wireless communication performed by an apparatus of a first EASDF. The method may include receiving filtering information indicating a set of network addresses. The method may include receiving a discovery message including a network address of the set of network addresses. The method may include providing at least part of the discovery message to the second EASDF or to a session management function (SMF) of the first network. The method may include obtaining, from the second EASDF in accordance with the network address, access information associated with an EAS of the second network In some implementations, the method can include selecting, associated with the indication, the second EASDF associated with at least the second network.

In some implementations, the filtering information indicates that the set of network addresses are associated with one or more EASs belonging to the second network.

Another innovative aspect of the subject matter described in this disclosure can be implemented in an apparatus of a first EASDF for wireless communication. The apparatus may include one or more interfaces configured to obtain filtering information indicating a set of network addresses; obtain a discovery message including a network address of the set of network addresses; output at least part of the discovery message to the second EASDF or to an SMF of the first network; and obtain, from the second EASDF in accordance with the network address, access information associated with an EAS of the second network.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a first EASDF, may cause the one or more processors to receive filtering information indicating a set of network addresses; receive a discovery message including a network address of the set of network addresses; provide at least part of the discovery message to the second EASDF or to an SMF of the first network; and obtain, from the second EASDF in accordance with the network address, access information associated with an EAS of the second network.

Another innovative aspect of the subject matter described in this disclosure can be implemented in an apparatus for wireless communication. The apparatus may include means for receiving filtering information indicating a set of network addresses; means for receiving a discovery message including a network address of the set of network addresses; means for providing at least part of the discovery message to the second EASDF or to an SMF of the first network; and means for obtaining, from the second EASDF in accordance with the network address, access information associated with an EAS of the second network.

Another innovative aspect of the subject matter described in this disclosure can be implemented in a method of wireless communication performed by an apparatus of a network entity. The method may include selecting a first EASDF associated with a first network, where the network entity is associated with the first network. The method may include receiving, from a second EASDF via the first EASDF, access information associated with an EAS of a second network, where the second EASDF is associated with the second network. The method may include communicating with the second network using the received access information.

In some implementations, communicating with the second network using the received access information further includes configuring a connection to the second network.

In some implementations, the communicating is associated with establishing a connection between a first user plane function of the first network and a network entity of the second network.

Another innovative aspect of the subject matter described in this disclosure can be implemented in an apparatus of a network entity for wireless communication. The apparatus may include a processing system configured to select a first EASDF associated with a first network, where the network entity is associated with the first network. The apparatus may include one or more interfaces configured to obtain, from a second EASDF via the first EASDF, access information associated with an EAS of a second network, where the second EASDF is associated with the second network; and communicate with the second network using the received access information.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a network entity, may cause the one or more processors to select a first EASDF associated with a first network, where the network entity is associated with the first network; receive, from a second EASDF via the first EASDF, access information associated with an EAS of a second network, where the second EASDF is associated with the second network; and communicate with the second network using the received access information.

Another innovative aspect of the subject matter described in this disclosure can be implemented in an apparatus for wireless communication. The apparatus may include means for receiving filtering information indicating a set of network addresses; means for receiving a discovery message including a network address of the set of network addresses; means for providing at least part of the discovery message to the second EASDF or to an SMF of the first network; and means for obtaining, from the second EASDF in accordance with the network address, access information associated with an EAS of the second network.

Another innovative aspect of the subject matter described in this disclosure can be implemented in a method of wireless communication performed by an apparatus of a network entity. The method may include selecting a unified data repository associated with a first network. The method may include transmitting, to the unified data repository, EAS deployment information including at least one of a public land mobile network (PLMN) identifier associated with a second network having an EAS or filtering information indicating a network address associated with the EAS.

In some implementations, the EAS deployment information is usable by a session management function for configuring an EAS discovery function of the first network to discover the EAS or an EAS discovery function of the second network.

Another innovative aspect of the subject matter described in this disclosure can be implemented in an apparatus of a network entity for wireless communication. The apparatus may include a processing system configured to select a unified data repository associated with a first network. The apparatus may include an interface configured to output, to the unified data repository via a network exposure function, EAS deployment information including at least one of a PLMN identifier associated with a second network having an EAS or filtering information indicating a network address associated with the EAS.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a network entity, may cause the one or more processors to select a unified data repository associated with a first network; and transmit, to the unified data repository, EAS deployment information including at least one of a PLMN identifier associated with a second network having an EAS or filtering information indicating a network address associated with the EAS.

Another innovative aspect of the subject matter described in this disclosure can be implemented in an apparatus for wireless communication. The apparatus may include means for selecting a unified data repository associated with a first network; and means for transmitting, to the unified data repository, EAS deployment information including at least one of a PLMN identifier associated with a second network having an EAS or filtering information indicating a network address associated with the EAS.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description. Other features, aspects, and advantages will become apparent from the description, the drawings and the claims. Note that the relative dimensions of the following figures may not be drawn to scale.

BRIEF DESCRIPTION OF THE DRAWINGS

FIG. 7 is a diagram illustrating an example of filtering information.

FIG. 8 is a diagram illustrating another example of filtering information.

FIG. 9 is a diagram illustrating an example process performed, for example, by a network entity.

FIG. 10 is a diagram illustrating an example process performed, for example, by a first EASDF.

FIG. 11 is a diagram illustrating an example process performed, for example, by a network entity.

Like reference numbers and designations in the various drawings indicate like elements.

DETAILED DESCRIPTION

Figure 1:
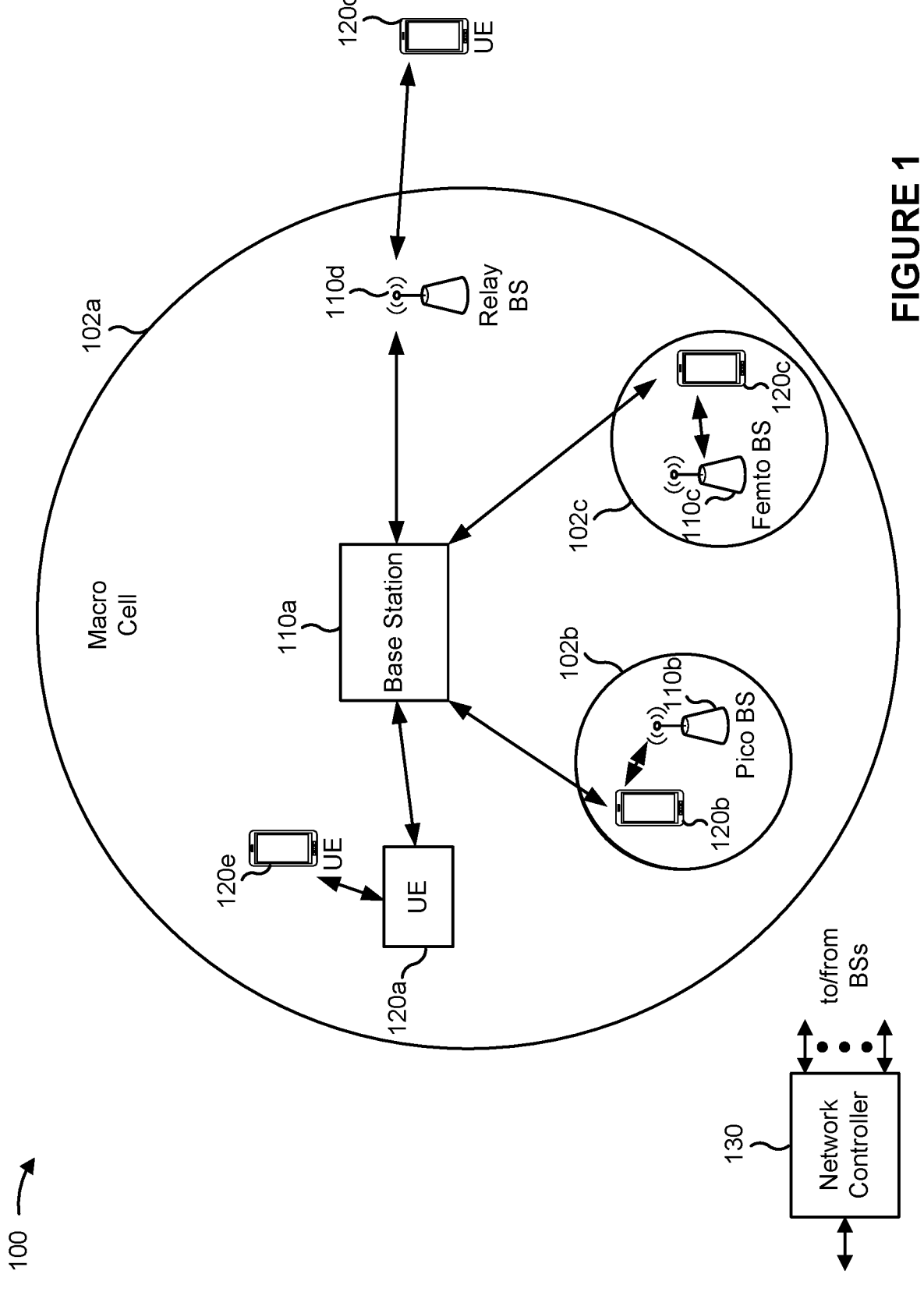
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G technology, 4G technology, 5G technology, or further implementations thereof.

An operator may offer access to resources (such as services, applications, and so on) for users associated with the operator. For example, users subscribing to a service offered by an operator may be allowed to access particular resources offered by the operator. In some cases, multiple operators may organize to allow access to resources across multiple operator platforms (OPs). An OP is a set of functional modules that enables an operator to place the solutions or applications of enterprises in close proximity to customers. An organization of multiple operators may be referred to as a federation. A federation of operators may configure their OPs to allow access to resources across multiple platforms, which allows access to resources across a wider geographical area and user base than if such resources are confined to access from a single platform. A federation may be associated with a federation broker and manager. The federation broker and manager roles in a given OP are responsible for interfacing with other OPs via an interface such as the East-West Bound Interface (EWBI). Typical scenarios enabled by the federation manager role include, but are not limited to, federation interconnection management, edge cloud resource exposure and monitoring towards partner OPs, application images and application metadata transfer towards partner OPs, application instantiation and termination towards partner OPs, application monitoring towards partner OPs, and service availability in visited networks.

An operator providing access to edge computing resources, such as edge data networks (EDNs), may be referred to as an edge computing service provider (ECSP). An ECSP may share edge computing resources with other ECSPs (such as via federation), which allows access to resources across a wider geographical area and user base. For example, a first ECSP and a second ECSP may provide edge computing resources within a network operated by an operator associated with the first ECSP. If the first ECSP is federated with the second ECSP, users associated with the operator of the network may be capable of accessing an edge computing service offered by the second ECSP while connected to the network operated by the operator associated with the first ECSP. For example, one ECSP may be capable of discovering the edge computing resources available from another ECSP within the network.

In some cases, an edge computing resource, such as an EDN, may be accessible via multiple networks, associated with multiple operators. For example, a UE may be subscribed to a service associated with a first ECSP. The UE may connect to another network associated with a second ECSP (such as a visited public land mobile network (PLMN)). For example, the other network may be a visited network. While connected to the other network, the UE may access the service associated with the first ECSP via the other network. For example, the first ECSP may provide, to the UE, information on resources available in the other network.

In some cases, ECSPs may share edge computing resources (such as EDNs) with one another. For example, a first ECSP and a second ECSP may share edge computing resources. If the first ECSP and the second ECSP share edge computing resources, a UE associated with the first ECSP may be capable of accessing the first ECSP's edge computing resources and the second ECSP's edge computing resources. Sharing of edge computing resources may be facilitated by cross-ECSP discovery of resources across operators. For example, an ECSP may discover edge computing resources available with a partner ECSP associated with a different operator. Furthermore, an ECSP with resources on another network (for example, a visited network) may provide information regarding a partner ECSP's services to a UE roaming to the other network.

Techniques described herein enable discovery, by a user connected to a first network, of an EAS associated with a second network. For example, some techniques described herein provide a shared EASDF, which allows users connected to different home networks to discover EASs across a plurality of networks. Some techniques described herein enable communication between EASDFs of different operator networks, such as interworking between EASDFs of different PLMNs. Thus, a user connected to a first network can discover an EAS of a second network (such as by communication with the shared EASDF or between an EASDF of the first network and an EASDF of the second network), which enables sharing of EASs across operator networks. Furthermore, techniques described herein enable communication between a UE connected to a first network and an EDN (such as an EAS hosted by the EDN) of a second network, such as by establishing a connection between a user plane function (UPF) of the first network associated with the UE and a network entity of the second network (such as a UPF of the second network or a network entity of the EDN).

Particular implementations of the subject matter described in this disclosure can be implemented to realize one or more of the following potential advantages. The enablement of discovery of EASs across different networks may facilitate the federation of different service providers so that the different service providers may reach a wider geographical area and user base. Furthermore, facilitating communication between the UE connected to the first network and the EDN of the second network may enable data connection for edge services across networks, which may help in achieving low-latency communication.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network entities, such as one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), or other network entities. A base station 110 is an example of a network entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A network entity such as a base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (for example, three) cells.

In some aspects, the terms "base station" (such as the base station 110) or "network entity" may refer to an aggregated base station, a disaggregated base station, an integrated access and backhaul (IAB) node, a relay node, or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the terms "base station" or "network entity" may refer to one device configured to perform one or more functions, such as those described herein in connection with the base station 110. In some aspects, the terms "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the terms "base station" or "network entity" may refer to any one or more of those different devices. In some aspects, the terms "base station" or "network entity" may refer to one or more virtual base stations or one or more virtual base station functions. For example, in some aspects, two or more base station functions may be instantiated on a single device. In some aspects, the terms "base station" or "network entity" may refer to one of the base station functions and not another. In this way, a single device may include more than one base station.

In some examples, a cell may not necessarily be stationary, and the geographic area of the cell may move according to the location of a base station 110 or component of the base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110*d* (for example, a relay base station) may communicate with the BS 110*a* (for example, a macro base station) and the UE 120*d* in order to facilitate communication between the BS 110*a* and the UE 120*d*. A base station 110 that relays communications may be referred to as a relay station, a relay base station, or a relay.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrow band IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular radio access technology (RAT) and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*c*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, it should be understood that the term "sub-6 GHz," if used herein, may broadly represent frequencies that may be less than 6 GHZ, may be within FR1, or may include mid-band frequencies. Further, unless specifically stated otherwise, it should be understood that the term "millimeter wave," if used herein, may broadly represent frequencies that may include mid-band frequencies, may be within FR2. FR4, FR4-a or FR4-1, or FR5, or may be within the EHF band. It is contemplated that the frequencies included in these operating bands (for example, FR1, FR2, FR3, FR4, FR4-a. FR4-1, or FR5) may be modified, and techniques described herein are applicable to those modified frequency ranges.

Figure 2:
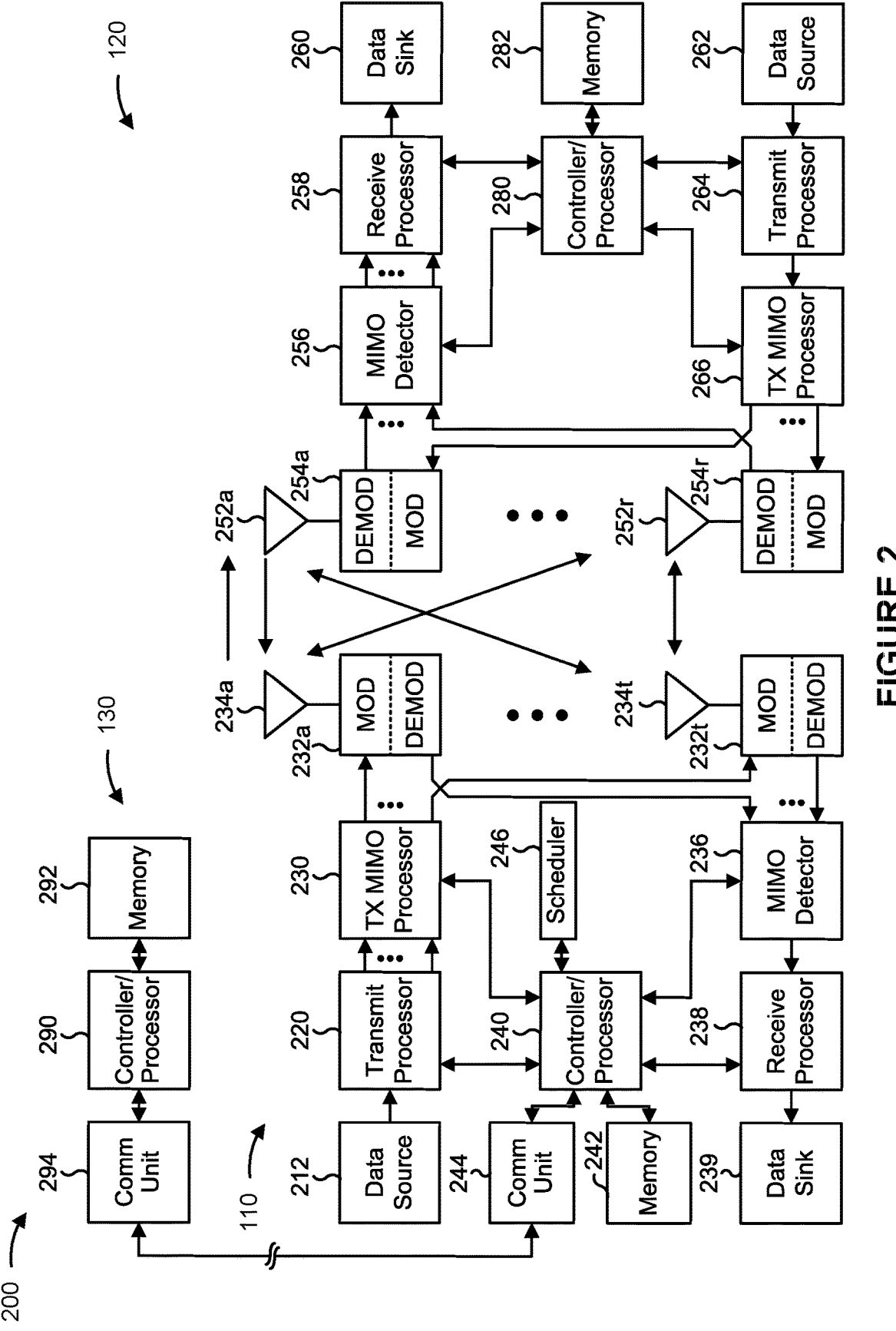
FIG. 2 is a diagram illustrating an example of a network entity in communication with a user equipment (UE) in a wireless network.

FIG. 2 is a diagram illustrating an example 200 of a network entity in communication with a UE 120 in a wireless network 100. FIG. 2 shows (and refers to) a base station 110, though the components shown in FIG. 2 can be implemented for any form of network entity. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The base station 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, Toutput symbol streams) to a corresponding set of modems 232 (for example, 7 modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein.

In some aspects, the controller/processor 240 may be a component of a processing system. A processing system may generally be a system or a series of machines or components that receives inputs and processes the inputs to produce a set of outputs (which may be passed to other systems or components of, for example, the base station 110). For example, a processing system of the base station 110 may be a system that includes the various other components or subcomponents of the base station 110.

The processing system of the base station 110 may interface with one or more other components of the base station 110, may process information received from one or more other components (such as inputs or signals), or may output information to one or more other components. For example, a chip or modem of the base station 110 may include a processing system, a first interface to receive or obtain information, and a second interface to output, transmit, or provide information. In some examples, the first interface may be an interface between the processing system of the chip or modem and a receiver, such that the base station 110 may receive information or signal inputs, and the information may be passed to the processing system. In some examples, the second interface may be an interface between the processing system of the chip or modem and a transmitter, such that the base station 110 may transmit information output from the chip or modem. A person having ordinary skill in the art will readily recognize that the second interface also may obtain or receive information or signal inputs, and the first interface also may output, transmit, or provide information.

The controller/processor 240 of the base station 110, the controller/processor 280 of the UE 120, or any other component(s) of FIG. 2 may perform one or more techniques associated with discovery of an edge application server across networks, as described in more detail elsewhere herein. For example, the controller/processor 240 of the base station 110, the controller/processor 280 of the UE 120, or any other component(s) (or combinations of components) of FIG. 2 may perform or direct operations of, for example, process 900 of FIG. 9, process 1000 of FIG. 10, process 1100 of FIG. 11, process 1200 of FIG. 12, or other processes as described herein. The memory 242 and the memory 282 may store data and program codes for the base station 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 900 of FIG. 9, process 1000 of FIG. 10, process 1100 of FIG. 11, process 1200 of FIG. 12, or other processes as described herein. In some examples, executing instructions may include running the instructions, converting the instructions, compiling the instructions, or interpreting the instructions.

In some aspects, a network entity includes means for providing, to a first edge application server (EAS) discovery function (EASDF) of a first network to which the network entity belongs, filtering information indicating a set of network addresses; means for receiving, from the first EASDF, an indication that a discovery message, received by the first EASDF, includes a network address of the set of network addresses; and/or means for transmitting, or causing the first EASDF to transmit, at least part of the discovery message to the second EASDF. In some aspects, the means for the network entity to perform operations described herein may include, for example, one or more of transmit processor 220, TX MIMO processor 230, modem 232, antenna 234, MIMO detector 236, receive processor 238, controller/processor 240, memory 242, or scheduler 246.

In some aspects, a first EASDF includes means for receiving filtering information indicating a set of network addresses; means for receiving a discovery message including a network address of the set of network addresses; means for providing at least part of the discovery message to the second EASDF or to a session management function (SMF) of the first network; and/or means for obtaining, from the second EASDF in accordance with the network address, access information associated with an EAS of the second network. In some aspects, the means for the first edge application server (EAS) to perform operations described herein may include, for example, one or more of, transmit processor 220, TX MIMO processor 230, modem 232, antenna 234, MIMO detector 236, receive processor 238, controller/processor 240, memory 242, or scheduler 246.

In some aspects, a network entity includes means for selecting a first EASDF associated with a first network, where the network entity is associated with the first network;

means for receiving, from a second EASDF via the first EASDF, access information associated with an EAS of a second network, where the second EASDF is associated with the second network; and/or means for communicating with the second network using the received access information. In some aspects, the means for the network entity to perform operations described herein may include, for example, one or more of, transmit processor 220, TX MIMO processor 230, modem 232, antenna 234, MIMO detector 236, receive processor 238, controller/processor 240, memory 242, or scheduler 246.

In some aspects, a network entity includes means for selecting a unified data repository associated with a first network; and/or means for transmitting, to the unified data repository, EAS deployment information including at least one of a PLMN identifier associated with a second network having an EAS or filtering information indicating a network address associated with the EAS. In some aspects, the means for the network entity to perform operations described herein may include, for example, one or more of, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3:
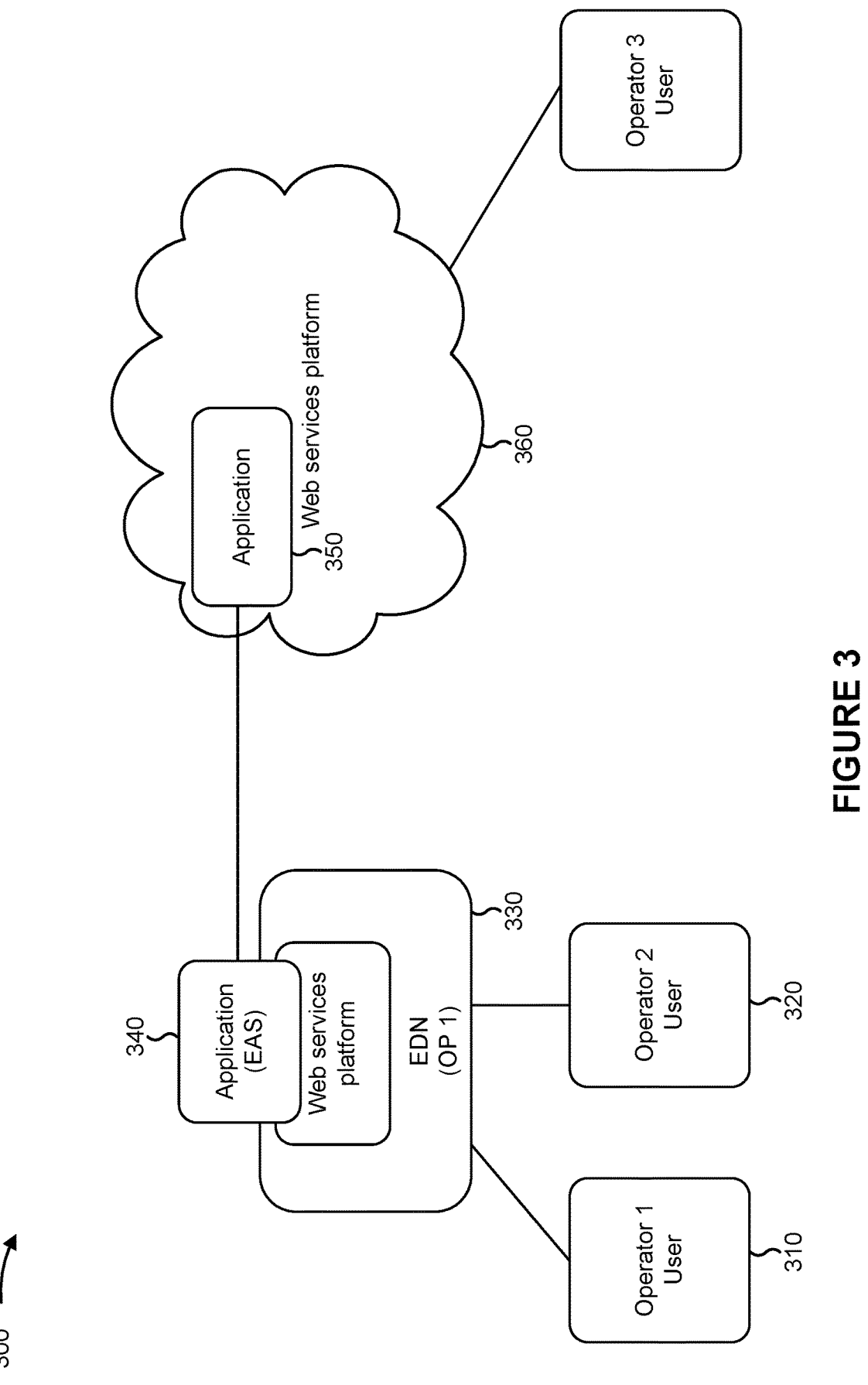
FIG. 3 is a diagram illustrating an example of an application provided via an edge application server (EAS) of an edge data network (EDN).

FIG. 3 is a diagram illustrating an example 300 of an application provided via an edge application server (EAS) of an edge data network (EDN).

In example 300, a user 310 (such as a UE 120) and a user 320 (such as a UE 120) may both access an EDN 330 hosted by a first operator (represented by OP 1). The user 310 may be associated with the first operator. As shown, the EDN 330 may include an edge application server (EAS) 340. An EAS is a network entity (such as a server, function, or process) that enables access to a service or application in an EDN. For example, the EAS 340 may provide access to an application 350 hosted by a web services platform 360. If the first operator and an operator of the web services platform 360 are federated (that is, share edge computing resources), then the user 310 and the user 320 may both be capable of accessing the EDN 330 and the service provided by the EAS 340. In some aspects, the web services platform 360 may be an ECSP which is not subject to a mobile network operator, such as a cloud service provider for edge computing services. The ECSP may be associated with one or more mobile network operators based on a service level agreement with the one or more mobile network operators. The web services platform 360 can be contrasted with a mobile network operator managed ECSP.

As an example, a user associated with a first operator, and attending an event in a certain location, may be connected to a first network (such as a PLMN) associated with the first operator. A second operator may provide content relating to the event in that location via an EAS implemented in a second network associated with the second operator. Without cooperation between the first operator and the second operator, the user may not be able to access the content associated with that event in that location. However, if the first operator and the second operator are federated, the first operator and the second operator may cooperate to establish a link between the user and an EAS of the second operator via the network associated with the first operator. Thus, the user can access the content associated with the event in that location.

Figure 4:
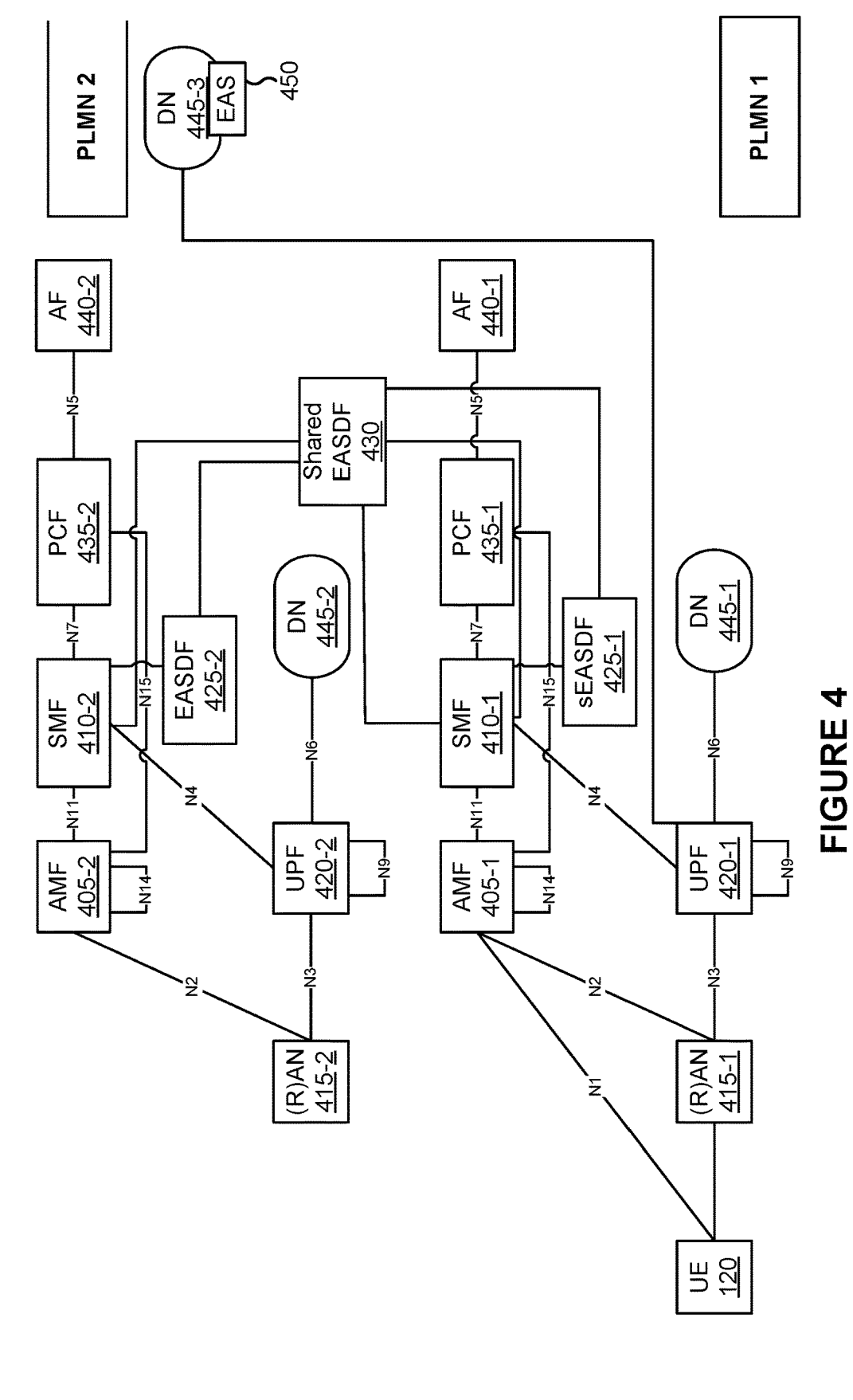
FIG. 4 is a diagram illustrating an example of a first network and a second network associated with a shared EASDF.

FIG. 4 is a diagram illustrating an example 400 of a first network (shown as PLMN 1, and sometimes referred to as a home network) and a second network (shown as PLMN 2, and sometimes referred to as a partner network) associated with a shared EASDF.

The first network and the second network include network entities 405, 410, 415, 420, 425, 435, and 440. The second network also includes a shared EASDF 430. A network entity associated with the first network is indicated by "−1" in the reference number of the network entity (for example, the UPF 420-1 is a network entity of the first network) and a network entity associated with the second network is indicated by "−2" in the reference number of the network entity (for example, the UPF 420-2 is a network entity of the second network). As shown, a UE 120 (sometimes referred to as a user) is connected to the first network. Thus, the first network may be a home public land mobile network (HPLMN) of the UE 120 or a serving public land mobile network (serving PLMN) of the UE 120.

As shown, a network (such as the first network or the second network) includes a number of network entities including an access and mobility management function (AMF) 405, a session management function (SMF) 410, an access node 415 (shown as (R) AN to indicate that the access node may or may not be a radio access node), a user plane function (UPF) 420, an EASDF 425, a policy charging function (PCF) 435, an application function (AF) 440, and a data network 445. The network entities 405, 410, 415, 420, 425, 435, 440 may be implemented as devices, logical functions, or a combination thereof. For example, each of the functional elements shown in FIG. 4 may be implemented on one or more devices associated with a wireless telecommunications system. In some aspects, one or more of the functional elements may be implemented on a physical device, such as an access point, a base station, a server, or a gateway. In some aspects, one or more of the functional elements may be implemented on a computing device of a cloud computing environment.

AMF 405 includes one or more devices that act as a termination point for non-access stratum (NAS) signaling and mobility management, among other examples.

SMF 410 includes one or more devices that support the establishment, modification, and release of communication sessions in the wireless telecommunications system. For example, SMF 410 may configure traffic steering policies at UPF 420 and may enforce UE network address allocation and policies, among other examples. In some aspects, SMF 410 may provide protocol configuration option (PCO) messaging to the UE 120 based on information received from one or more other network entities.

Access node 415 may provide the UE 120 with access to the first network, such as via a radio interface. For example, access node 415 may include a BS 110, a radio unit (RU), a distributed unit (DU), or a central unit (CU), described in connection with FIGS. 1 and 2.

UPF 420 includes one or more devices that serve as an anchor point for intra-RAT or inter-RAT mobility. UPF 420 may apply rules to packets, such as rules pertaining to packet routing, traffic reporting, or handling user plane quality of service (QOS), among other examples. In some aspects, UPF 420 may handle the establishment and management of tunnels with the network provided by the home service provider (SP), as described in more detail elsewhere herein.

The EASDF 425 facilitates discovery of EAS 450 and EASs of a network to which the EASDF 425 belongs (that is, a network with which the EASDF is associated). An EASDF 425 may be associated with a network if the EASDF 425 has discovery information (e.g., filtering information or a network address) for EASs belonging to the second network. The EASDF 425 may be configured by the SMF 410 to handle domain name system (DNS) lookup for a UE 120. For example, the SMF 410 may create and update a DNS context associated with the UE 120 for the EASDF 425. The EASDF 425 may receive a DNS query (sometimes referred to as a discovery message) from the UE 120. The EASDF 425 may refer to filtering information, configured by the SMF 410 or the AF 440, to ascertain or determine if a network address of the DNS query is associated with a shared EASDF 430 or an EASDF 425 of another network (such as the second network). The EASDF 425, or the SMF 410, may provide the DNS request to the shared EASDF 430 or the EASDF 425. The SMF 410 or the EASDF 425 may receive a DNS response and may provide the DNS response to the UE 120. The DNS response may include information for communicating with an EAS 450. Thus, the EASDF 425 may facilitate discovery of EASs in another network by the UE 120.

The shared EASDF 430 facilitates discovery of EASs of a network to which the UE 120 does not belong. The shared EASDF 430 may enable users (such as UE 120) to connect to different home networks (such as home PLMNs (HPLMNs)) and discover EASs across the different networks. The shared EASDF may be associated with a plurality of operators, such as a plurality of mobile network operators (MNOs). In some examples, the plurality of operators may be federated. An operator, of the plurality of operators, may be capable of updating records associated with the operator on the shared EASDF 430 (such as based on a service level agreement). The plurality of operators may treat the shared EASDF 430 as a trusted external AF. A particular network, managed by a particular operator, may manage the shared EASDF 430. The particular network may be referred to as an anchor network. The anchor network may be the network that initiates sharing of the shared EASDF 430. Other EASs (such as EAS 450) may be made discoverable by the shared EASDF 430 based on configuration of the shared EASDF 430 via the anchor network. An operator of the anchor network may be referred to as an anchor operator. The anchor operator may manage the anchor network and the shared EASDF 430. Other networks, associated with other operators, may access the shared EASDF 430. In some aspects, the anchor operator may have service level agreements with the other operators such that the other operators can access the shared EASDF 430. In example 400, the anchor operator is associated with the second network (PLMN 2). As shown, the shared EASDF 430 may have connections with the EASDFs 425 and the SMFs 410.

The EASDF 425 and the shared EASDF 430 may coexist in the same network (such as the same PLMN). A UE 120 may be associated with a protocol data unit (PDU) session via which the UE 120 may communicate with one or more EASs 450. For discovering an EAS in an EDN of a network to which the UE 120 belongs, an EASDF 425 belonging to the network may be used (such as for DNS resolution of the EAS in the EDN of the network to which the UE 120 belongs). For discovering an EAS belonging to a different network than the UE 120, the shared EASDF 430 may be used.

PCF 435 includes one or more devices that provide a policy framework that incorporates network slicing, roaming, packet processing, or mobility management, among other examples.

AF 440 may act as a quality controller for applications. For example, the AF 440 may establish quality-of-service aspects or charging aspects for a given service. In some aspects, the AF 440 may communicate using control plane signaling. In some aspects, the AF 440 may configure filtering information for an EASDF 425, which may be used for the EASDF 425 to identify a shared EASDF 430 or an EASDF 425 belonging to a different network.

Data network 445 includes one or more wired or wireless data networks. For example, data network 445 may include an Internet Protocol (IP) multimedia subsystem (IMS), a PLMN, a local area network (LAN), a wide area network (WAN), a metropolitan area network (MAN), a private network such as a corporate intranet, an ad hoc network, the Internet, a fiber optic-based network, a cloud computing network, a third party services network, an operator services network, a standalone non-public network (SNPN), or a combination of these or other types of networks. In some aspects, the UE 120 may access services provided by the EAS 450 via the data network 445. While the first network, the second network, and the EAS 450 are shown as associated with different data networks, in some cases, two or more of the data networks shown in example 400 may be the same data network.

EAS 450 is an application server that resides in an edge hosting environment such as an EDN. EAS 450 may provide an application (such as a service). EAS 450 may be associated with a network address, such as an Internet Protocol address, which may be associated with a fully qualified domain name (FQDN). EASDF 425 or shared EASDF 430 may perform a DNS query (by transmitting a discovery message such as a DNS query), using the FQDN, to identify the network address of the EAS 450. EAS 450 may communicate with UE 120, such as via a UPF 420 associated with the UE 120 or a UPF 420 associated with EAS 450.

Figure 5:
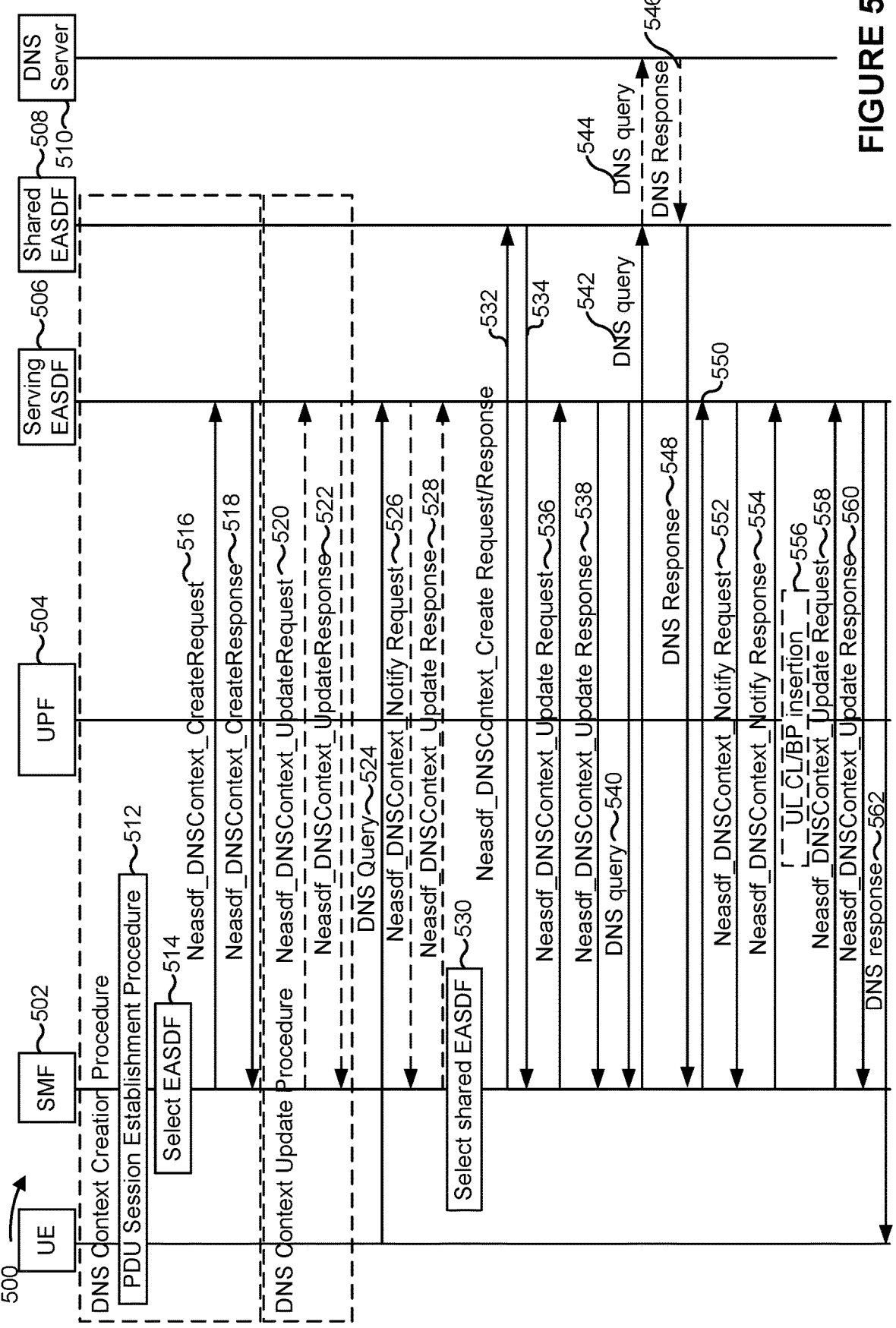
FIG. 5 is a diagram illustrating an example call flow diagram for discovery via a shared EAS discovery function (EASDF).

FIG. 5 is a diagram illustrating an example call flow diagram 500 for discovery via a shared EASDF. The example 500 includes a UE (such as UE 120), an SMF 502 (such as the SMF 410-1), a UPF 504 (such as the UPF 420), a serving EASDF 506 (such as the EASDF 425), a shared EASDF 508 (such as the EASDF 430), and a DNS server 510. The UPF 504 may function as, for example, an uplink classifier (UL CL), an IPV6 multi-homing branching point (BP), a PDU session anchor (PSA) (such as a local PSA UPF), or a combination thereof. A UL CL is a functionality supported by a UPF 504 that can apply a matching traffic filter provided by an SMF 502. For example, the SMF 502 may insert, into the data path of a PDU session, a UPF 504 supporting the UL CL functionality during or after PDU session establishment. The PSA is the anchor of the PDU session. The anchor of the PDU session is the end point to the data network. If a local UPF is added (such as a UL CL or IPv6 multi-homing BP), the traffic through the local UPF may go through a local PSA UPF, which is the end point to the local data network (in this case, the EDN). The local PSA UPF may be connected to the UL CL or the IPV6 multi-homing branching point.

As shown in example 500, and by reference number 512, the UE and the SMF 502 may perform a PDU session establishment procedure. For example, the UE and the SMF may exchange signaling such that the UE establishes a PDU session with the SMF 502. As shown by reference number 514, the SMF 502 may select an EASDF. For example, the SMF may select the serving EASDF 506 to serve as a serving EASDF of the UE. Acting as a serving EASDF may entail the serving EASDF 506 handling DNS queries of the UE, such as with regard to the shared EASDF 508.

As shown by reference number 516 and 518, the SMF 502 may create a DNS context with the serving EASDF 506. For example, the SMF 502 and the serving EASDF 506 may exchange DNS context creation messages (shown as Neasdf_DNSContext_Create Request and Neasdf_DNSContext-_CreateResponse). In some aspects, the DNS context may be associated with the UE. For example, the DNS context may indicate rules (such as filtering information) regarding how the serving EASDF 506 may handle DNS messages from the UE. As shown by reference number 520 and 522, the SMF 502 may optionally update the DNS context (such as by performing a DNS context update procedure). For example, the SMF 502 may modify the DNS context by exchanging DNS context update messages (shown as Neasdf_DNSContext_UpdateRequest and Neasdf_DNSContext_UpdateResponse) with the serving EASDF 506. In some aspects, by creating or updating the DNS context, the SMF 502 may provide filtering information to the serving EASDF 506. The filtering information may indicate a set of network addresses. For example, the filtering information may indicate a set of network addresses which, if included in a DNS query, indicate that the UE is attempting to ascertain, obtain, or determine a network address of the shared EASDF 508. In some aspects, the filtering information may include a FQDN filter. For example, the filtering information may indicate one or more FQDN ranges that define the set of network addresses. In some aspects, the filtering information may include a DNS server address filter. If the serving EASDF 506 receives a DNS query from the UE that matches a network address of the set of network addresses, the serving EASDF 506 may forward the DNS query to the shared EASDF 508 or may notify the SMF 502 that the DNS query matches the network address (such as by providing at least part of the DNS query to the SMF 502 or by providing an indication that a DNS query matches a network address of the set of network addresses). In some aspects, the filtering information may include a PLMN identifier, such that the serving EASDF 506 can notify the shared EASDF of the PLMN identifier associated with a DNS query that matches a network address. Examples of filtering information are provided in FIGS. 7 and 8.

In some aspects, the SMF 502 may receive the filtering information. For example, the SMF 502 may obtain the filtering information from a network exposure function (NEF) or a unified data repository (UDR) (not shown in FIG. 5 for simplicity). A UDR is a database that stores subscription-related data, such as subscription data, policy data, structured data for exposure, and application data. An NEF may expose network capabilities to an application function (AF), provide authentication, authorization, and throttling of the AF, handle translation between the AF and internal network functions, and so on. In some aspects, the filtering information may be included in EAS deployment information. For example, an AF associated with the second network may provide the EAS deployment information to one or more NEFs. The one or more NEFs may be associated with one or more networks. For example, the one or more networks may include the first network. The one or more networks may be associated with a federation with an operator of the second network. In some aspects, the EAS deployment information may include a network identifier of the second network, such as a PLMN identifier. In some aspects, the EAS deployment information may include filtering information, such as an FQDN filter or a DNS server address filter.

As shown by reference number 524, the serving EASDF 506 may receive a DNS query (sometimes referred to as a discovery message) from the UE. The DNS query may indicate a network address identified by the filtering information. For example, the DNS query may include an FQDN (or a portion of an FQDN) that satisfies a rule indicated by the filtering information. Accordingly, as shown by reference numbers 526 and 528, the serving EASDF may provide an indication (shown as Neasdf_DNSContext_Notify Request) to the SMF 502, and the SMF 502 may acknowledge the indication (such as via a context notify message shown as Neasdf_DNSContext_Update Response).

As shown by reference number 530, the SMF 502 may select the shared EASDF 508. For example, the SMF 502 may select the shared EASDF 508 as a destination for the DNS query. In some aspects, the SMF 502 may select the shared EASDF based on the filtering information. For example, the SMF 502 may select, ascertain or determine a shared EASDF 508 associated with the network address of the DNS query. In some aspects, the SMF 502 may select the shared EASDF 508 based on the notification of the DNS query or based on the DNS query. For example, the SMF 502 may select a shared EASDF 508 that is associated with a PLMN identifier indicated by the notification of the DNS query. As shown by reference number 532 and 534, the SMF 502 may create a DNS context with the shared EASDF 508. For example, the SMF 502 and the shared EASDF 508 may exchange DNS context creation messages (shown as Neasdf_DNSContext_Create Request/Response, and including a request and a response). In some aspects, the DNS context may be associated with the UE. For example, the DNS context may indicate rules (such as filtering information) regarding how the shared EASDF 508 may handle DNS messages from the UE. In some aspects, the DNS context may be associated with the serving EASDF 506 or the SMF 502. For example, the DNS context may indicate rules (such as filtering information) regarding how the shared EASDF 508 may handle DNS messages from the serving EASDF 506 or the SMF 502. As shown by reference number 536 and 538, the SMF 502 may optionally update the DNS context of the serving EASDF 506. For example, the SMF 502 may modify the DNS context by exchanging DNS context update messages (shown as Neasdf_DNSContext_Update Request and Neasdf_DNSContext_Update Response) with the serving EASDF 506. In some aspects, the SMF 502 may update the DNS context to indicate that the serving EASDF 506 should forward to the DNS query to the SMF 502 for relaying to the shared EASDF 508. In some other aspects, as described in connection with FIG. 6. the SMF 502 may update the DNS context to indicate that the serving EASDF 506 should forward the DNS query to the shared EASDF 508.

As shown by reference number 540, the serving EASDF 506 may provide at least part of the DNS query to the SMF 502. As shown by reference number 542, the SMF 502 may provide the at least part of the DNS query to the shared EASDF 508. As shown by reference number 544, the shared EASDF 508 may provide the DNS query to the DNS server. As shown by reference number 546, the DNS server may provide a DNS response to the shared EASDF 508. The DNS response may indicate one or more network addresses associated with an EAS of the second network, such as one or more IP addresses. For example, the one or more IP addresses may correspond to the network address identified by the DNS query.

In some aspects, the serving EASDF 506 may provide the DNS query to the shared EASDF 508. For example, the SMF 502 may cause the serving EASDF 506 to provide the DNS query to the shared EASDF 508 (such as by transmitting an indication to provide the DNS query to the shared EASDF 508, or by configuring a DNS context of the serving EASDF 506 to cause the serving EASDF 506 to provide the DNS query to the shared EASDF 508). In some aspects, the shared EASDF 508 may provide a DNS response to the serving EASDF 506. In such examples, the serving EASDF 506 may notify the SMF 502 of the DNS response and may provide the DNS response to the UE (such as after the SMF 502 performs one or more DNS context updates or releases).

As shown by reference number 548, the shared EASDF 508 may provide the DNS response to the SMF 502. For example, the shared EASDF 508 may provide the DNS response to the SMF 502 based on the DNS context configured for the shared EASDF 508. As shown by reference number 550, the SMF 502 may provide the DNS response to the serving EASDF 506. As shown by reference number 552, in some aspects, the serving EASDF 506 may provide a DNS context notify message (shown as Neasdf_DNSContext_Notify Request) to the SMF indicating that the DNS response has been received. For example, the serving EASDF 506 may provide the DNS context notify message based on the DNS context configured for the serving EASDF 506. As shown by reference number 554, the serving EASDF 506 may receive a response (shown as Neasdf_DNSContext_Notify Response) from the SMF 502 based on the DNS context notify message. As shown by reference number 556, in some aspects, the SMF may insert (such as may configure) a UL CL of a UPF or a branching point (BP) of a UPF in the PDU session of the UE. As shown by reference numbers 558 and 560, the SMF may update the DNS context of the serving EASDF 506 (such as using Neasdf_DNSContext_Update Request), and the serving EASDF 506 may provide a response (shown as Neasdf_DNSContext_Update Response) to the updating of the DNS context. For example, the updated DNS context may indicate to provide the DNS response to the UE. As shown by reference number 562, the serving EASDF 506 may provide the DNS response to the UE. In some aspects, the SMF may configure a connection between one or more devices of the second network (such as the EAS identified by the DNS response, an EDN network entity associated with the EAS, or a UPF associated with the same network as the EAS), which is not shown in FIGS. 5A and 5B. In this way, a shared EASDF 508 enables discovery of an EAS associated with a different network or operator than the UE, which improves functionality of federated edge computing resources and improves network coverage.

Figure 6:
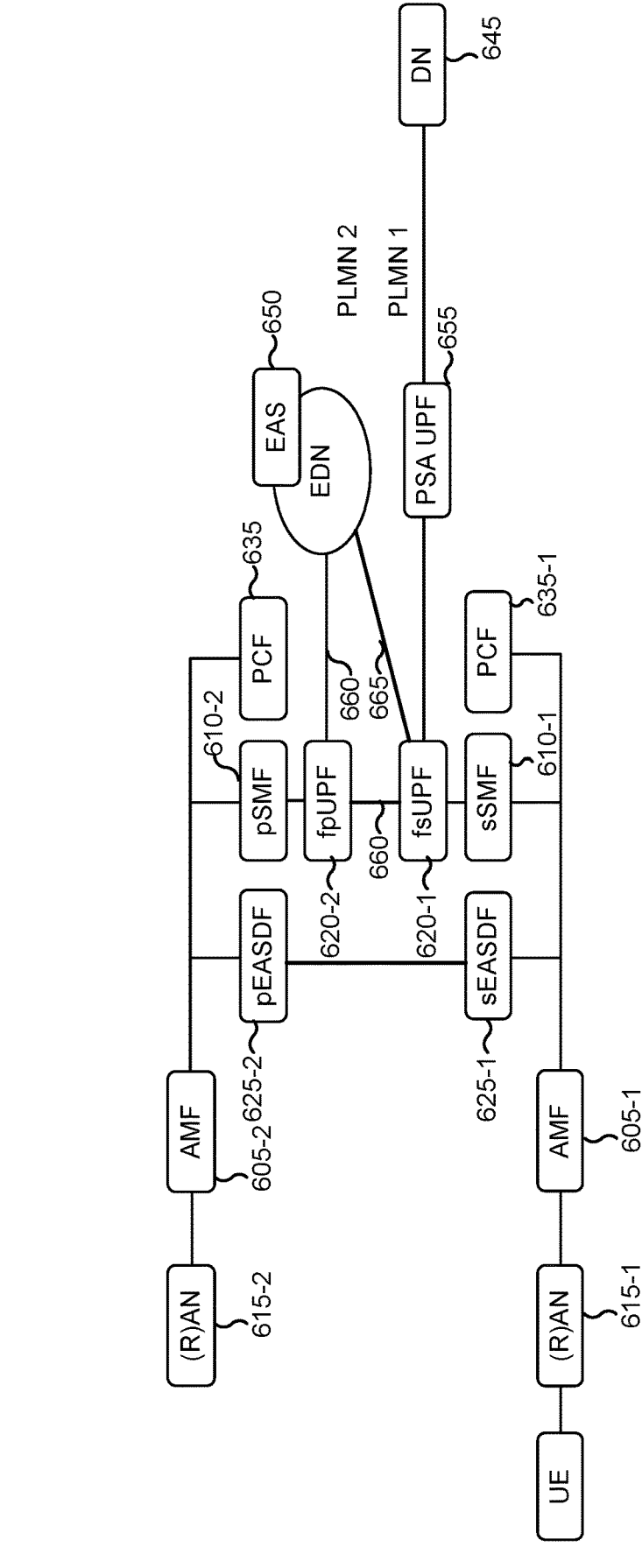
FIG. 6 is a diagram illustrating an example of a serving network and a partner network associated with a serving EASDF and a partner EASDF.

FIG. 6 is a diagram illustrating an example 600 of a serving network and a partner network associated with a serving EASDF and a partner EASDF. FIG. 6 also illustrates example paths for communication between the UE of the serving network and the EDN or EAS of a partner network associated with the partner EASDF. It should be noted that the example paths for communication between the UE of the serving network and the EDN or EAS of the partner network can also be implemented in the networks shown in FIG. 4, and are not dependent on the serving EASDF/partner EASDF architecture.

Example 600 includes a first network (PLMN 1) and a second network (PLMN 2). A UE (such as UE 120) is connected to the first network. A network entity associated with the first network is indicated by "–1" in the reference number of the network entity (for example, the AMF 605-1 is a network entity of the first network) and a network entity associated with the second network is indicated by "–2" in the reference number of the network entity (for example, the AMF 605-2 is a network entity of the second network). As shown, a UE 120 (sometimes referred to as a user) is connected to the first network. Thus, the first network may be an HPLMN of the UE 120.

As shown, a network (such as the first network or the second network) includes an access and mobility management function (AMF) 605, an SMF 610, an access node 615 (shown as (R) AN to indicate that the access node may or may not be a radio access node), a federated UPF 620 (shown as fsUPF ("federated serving UPF") in the serving network and fpUPF ("federated partner UPF") in the partner network), an EASDF 625 (SEASDF ("serving EASDF") in the serving network, and pEASDF ("partner EASDF") in the partner network), and a PCF 635. Furthermore, the serving network is associated with a PSA UPF 655 and a data network 645.

The SEASDF 625-1 and the pEASDF 625-2 may communicate with one another to facilitate discovery of the EAS 650 by the UE. For example, each of the first PLMN and the second PLMN may be associated with a respective EASDF 625. If more than two PLMNs are federated, then each of the federated PLMNs may be associated with a respective EASDF 625. The sSMF 610-1 of the first network may select the SEASDF 625-1 and the pEASDF 625-2 for discovery of the EAS 650. For example, an AF may configure a NEF or a UDR (not shown in FIG. 6 for simplicity) with filtering information. In some aspects, the filtering information may be included in EAS deployment information. The filtering information may include, for example, information indicating a PLMN of the EAS 650, information indicating a set of network addresses associated with the EAS 650 (such as a FQDN or a range of FQDNs, a set of IP addresses or a range of IP addresses associated with a data network access identifier (DNAI), a DNS server identifier associated with a DNAI, or other information). For example, the filtering information may indicate a set of network addresses and may indicate that the set of network addresses are associated with a DNAI. The sSMF 610-1 may use the DNAI to select a UPF for UL CL or IPV6 BP, as described elsewhere herein. The one or more NEFs may be associated with one or more networks. For example, the one or more networks may include the first network, and may be associated with a federation with an operator of the second network. In some aspects, the EAS deployment information may include a network identifier of the second network, such as a PLMN identifier. In some aspects, the EAS deployment information may include filtering information, such as an FQDN filter or a DNS server address filter. The sSMF 610-1 may obtain the filtering information from the NEF or the UDR. The sSMF 610-1 may select a pEASDF 625-2 for a DNS query received from the UE (such as from the SEASDF 625-1). For example the sSMF 610-1 may select, ascertain or determine a pEASDF 625-2 associated with a PLMN identifier based on matching an FQDN of the DNS query with an entry of an FQDN filter that corresponds to the PLMN identifier, and based on a DNS server address in the DNS query matching with an entry of the DNS server address filter that corresponds to the PLMN identifier. The sSMF 610-1 or the SEASDF 625-1 may forward the DNS query to the pEASDF 625-2. For example, the sSMF 610-1 may provide an indication for the SEASDF 625-1 to forward the DNS query to the pEASDF 625-2.

As mentioned, example 600 also shows data paths 660 and 665 between the first network and the second network. For example, the first network may implement data path 660, or may implement data path 665. As shown, example 600 may involve one or more federated UPFs. For example, the first network may include a federated serving UPF (shown as fsUPF). In examples using the data path 660, the second network may include a federated partner UPF (shown as fpUPF). A federated UPF is a UPF associated with providing a data path between networks to facilitate communication with an EAS. For example, a federated UPF may act as a gateway between federated PLMNs. A federated UPF may be associated with a specific DNAI. For example, a federated UPF may be associated with a DNAI designated for communication with an EAS. The SEASDF 625-1 may receive a DNAI from the pEASDF 625-2. The DNAI may correspond to the fpUPF 620-2 or may correspond to an EDN that includes the EAS 650. The sSMF 610-1 may configure a connection between the fsUPF 620-1 and a network entity associated with the received DNAI (which may be the fpUPF 620-2 or a network entity of the EDN). For example, the connection may be associated with an N6 interface. In some aspects, the sSMF 610-1 may insert a UL CL or BP UPF to facilitate the connection, such that other traffic of the UE's PDU session is not impacted. Thus, the sSMF 610-1 may configure a connection between an fsUPF 620-1 associated with the UE and a network entity of the second network to facilitate communication of the UE with the network entity of the second network.

Data path 660 represents a connection between the fsUPF 620-1 and the fpUPF 620-2. As shown, the data path 660 may proceed from the fsUPF 620-1 to the fpUPF 620-2, then to the EDN that hosts the EAS 650. Data path 665 represents a connection between the fsUPF 620-1 and the EDN that hosts the EAS 650.

The sSMF 610-1 may communicate with the SEASDF 625-1 and the pSMF 610-2 to configure the data path 660. For example, the SEASDF 625-1 may receive a DNS response from the pEASDF 625-2. The SEASDF 625-1 may report the DNS response to the sSMF 610-1. The DNS response may indicate an IP address of the EAS 650 (such as a specific DNAI of the EAS 650), a network identifier of the second network, and whether to configure an fsUPF that can connect to the second network. The reporting of the DNS response, or the DNS response itself, may indicate a need to configure an fsUPF 620-1. The sSMF 610-1 may configure the fsUPF 620-1 to connect to an fpUPF 620-2 of the second network. The sSMF 610-1 may configure the fsUPF 620-1 based on whether connectivity to the EDN of the second network is supported (that is, whether data path 660 or data path 665 is supported). For example, based on the DNAI or Extended DNS client subnet (ECS), which will be indicated in the DNS response, the sSMF 610-1 can determine whether to use data path 660 or 665. If data path 660 is supported, then the fsUPF 620-1 may be configured with the IP address/port of the fpUPF. If data path 665 is supported, then the fsUPF 620-1 may be configured with the IP address/port of the EDN/EAS. The sSMF 610-1 may select, ascertain or determine a specific UPF for the data path (of data path 660 or 665) that is supported, and may insert the selected UPF (that is, fsUPF 620-1) for the PDU session. The sSMF 610-1 may communicate configuration information with the pSMF 610-2 to configure the connection (such as a user plane connection), such as to exchange a charging policy or a traffic steering policy. The sSMF

610-1 or the pSMF 610-2 may establish the connection based on the communicated configuration information associated with the connection.

The sSMF 610-1 may communicate with the sEASDF 625-1 to configure the data path 665. For example, the SEASDF 625-1 may receive a DNS response from the pEASDF 625-2. The SEASDF 625-1 may report the DNS response to the sSMF 610-1. The DNS response may indicate an IP address of the EAS 650 (such as a specific DNAI of the EAS 650), a network identifier of the second network, and whether to configure an fsUPF that can connect to the second network. The sSMF 610-1 may configure the fsUPF 620-1 based on the DNS response. The fsUPF 620-1 may be accessible to the data network of the partner PLMN.

FIG. 7 is a diagram illustrating an example 700 of filtering information. Example 700 includes a column 705, a column 710, and a column 715. The filtering information of example 700 may be used to select a partner EASDF or a shared EASDF. The column 705 indicates a target DNS server address of a DNS query. For example, a UE may provide a DNS query that includes the target DNS server address. The column 710 indicates a DNS server address filter. An asterisk ("*") indicates a wildcard. If a target DNS server address of a DNS query matches an entry of the column 710, then an SMF may select a particular EASDF, such as an EASDF associated with a network specified by the filtering information. As an example, shown by reference number 720, since the target DNS server address of the first row of example 700 matches the DNS server address filter of the first row of example 700, the SMF may select a partner EASDF or shared EASDF associated with mobile network operator 1. As another example, shown by reference number 725, since the target DNS server address of the second row of example 700 matches the DNS server address filter of the second row of example 700, the SMF may select a partner EASDF or shared EASDF associated with mobile network operator X.

FIG. 8 is a diagram illustrating another example 800 of filtering information. In FIG. 8, the filtering information is based on FQDNs. For example, a DNS query may indicate an FQDN, as shown in the column 805. If the FQDN matches a row of an FQDN filter, shown in the column 810, then an SMF may select a corresponding shared EASDF or partner EASDF, as shown in the column 815. As shown by reference number 820, if no match is found, then the SMF may not select a shared EASDF or partner EASDF.

FIG. 9 is a diagram illustrating an example process 900 performed, for example, by a network entity. The process 900 is an example where the network entity (for example, SMF 410, SMF 502, or SMF 610) performs operations associated with discovery of an EAS across networks.

As shown in FIG. 9, in some aspects, the process 900 may include providing, to a first EASDF of a first network to which the network entity belongs, filtering information indicating a set of network addresses (block 910). For example, the network entity (such as by using transmission component 1304, depicted in FIG. 13) may provide, to a first EASDF of a first network to which the network entity belongs, filtering information indicating a set of network addresses.

As further shown in FIG. 9, in some aspects, the process 900 may include receiving, from the first EASDF, an indication that a discovery message, received by the first EASDF, includes a network address of the set of network addresses (block 920). For example, the network entity (such as by using reception component 1302, depicted in FIG. 13) may receive, from the first EASDF, an indication that a discovery message, received by the first EASDF, includes a network address of the set of network addresses.

As further shown in FIG. 9, in some aspects, the process 900 may include transmitting, or causing the first EASDF to transmit, at least part of the discovery message to the second EASDF (block 930). For example, the network entity (such as by using transmission component 1304, depicted in FIG. 13) may transmit, or cause the first EASDF to transmit, at least part of the discovery message to the second EASDF.

The process 900 may include additional aspects, such as any single aspect or any combination of aspects described in connection with the process 900 or in connection with one or more other processes described elsewhere herein.

In a first additional aspect, the process 900 includes selecting (for example, using selection component 1308, depicted in FIG. 13), in accordance with the indication, the second EASDF associated with at least the second network.

In a second additional aspect, alone or in combination with the first aspect, the network address is associated with an EAS associated with the second network.

In a third additional aspect, alone or in combination with one or more of the first and second aspects, the filtering information indicates that the set of network addresses are associated with one or more EASs belonging to the second network.

In a fourth additional aspect, alone or in combination with one or more of the first through third aspects, the set of network addresses identifies a set of fully qualified domain names.

In a fifth additional aspect, alone or in combination with one or more of the first through fourth aspects, the discovery message is a domain name service query message.

In a sixth additional aspect, alone or in combination with one or more of the first through fifth aspects, the second EASDF is associated with at least the second network if the second EASDF has discovery information for EASs belonging to the second network.

In a seventh additional aspect, alone or in combination with one or more of the first through sixth aspects, the second EASDF is associated with a plurality of networks including the second network.

In an eighth additional aspect, alone or in combination with one or more of the first through seventh aspects, the second EASDF is associated with only the second network and the first EASDF is associated with only the first network.

In a ninth additional aspect, alone or in combination with one or more of the first through eighth aspects, the filtering information is associated with a PLMN identifier of the second network, and where providing, or causing the first EASDF to provide, at least part of the discovery message to the second EASDF further includes providing, or causing the first EASDF to provide, at least part of the discovery message to the second EASDF based at least in part on the second EASDF being associated with the second network.

In a tenth additional aspect, alone or in combination with one or more of the first through ninth aspects, the process 900 includes receiving, from the second EASDF via the first EASDF, access information associated with an EAS of the second network, and establishing a connection to the second network based at least in part on the access information.

In an eleventh additional aspect, alone or in combination with one or more of the first through tenth aspects, the connection is between a first user plane function of the first network and a network entity of the second network.

In a twelfth additional aspect, alone or in combination with one or more of the first through eleventh aspects, the network entity of the second network is a second user plane function of the second network.

In a thirteenth additional aspect, alone or in combination with one or more of the first through twelfth aspects, the process 900 includes transmitting, to the second user plane function based at least in part on the first user plane function of the first network being a session anchor of the connection, information indicating an Internet Protocol address of a UE associated with the connection.

In a fourteenth additional aspect, alone or in combination with one or more of the first through thirteenth aspects, the process 900 includes receiving, from the second user plane function based at least in part on the second user plane function being a session anchor of the connection, information indicating an Internet Protocol address of a UE associated with the connection.

In a fifteenth additional aspect, alone or in combination with one or more of the first through fourteenth aspects, the first user plane function is designated for communication with EASs of the second network.

In a sixteenth additional aspect, alone or in combination with one or more of the first through fifteenth aspects, the access information is specific to the first user plane function.

In a seventeenth additional aspect, alone or in combination with one or more of the first through sixteenth aspects, the network entity of the second network is associated with an edge data network of the second network.

In an eighteenth additional aspect, alone or in combination with one or more of the first through seventeenth aspects, the process 900 includes configuring the first user plane function based at least in part on the access information, where the first user plane function is accessible to an edge data network of the second network.

In a nineteenth additional aspect, alone or in combination with one or more of the first through eighteenth aspects, establishing the connection further includes communicating with a session management function of the second network to configure the connection.

In a twentieth additional aspect, alone or in combination with one or more of the first through nineteenth aspects, the process 900 includes obtaining EAS deployment information indicating the filtering information from a network exposure function (NEF) of the first network.

In a twenty-first additional aspect, alone or in combination with one or more of the first through twentieth aspects, the EAS deployment information indicates a public land mobile network (PLMN) identifier of the second network.

Although FIG. 9 shows example blocks of the process 900, in some aspects, the process 900 may include additional blocks, fewer blocks, different blocks, or differently arranged blocks than those depicted in FIG. 9. Additionally, or alternatively, two or more of the blocks of the process 900 may be performed in parallel.

FIG. 10 is a diagram illustrating an example process 1000 performed, for example, by a first EASDF. The process 1000 is an example where the first EASDF (for example, EASDF 425, shared EASDF 430, serving EASDF 506, shared EASDF 508, or sEASDF 625-1) performs operations associated with discovery of an EAS across networks.

As shown in FIG. 10, in some aspects, the process 1000 may include receiving filtering information indicating a set of network addresses (block 1010). For example, the first EASDF (such as by using reception component 1402, depicted in FIG. 14) may receive filtering information indicating a set of network addresses.

As further shown in FIG. 10, in some aspects, the process 1000 may include receiving a discovery message including a network address of the set of network addresses (block 1020). For example, the first EASDF (such as by using reception component 1402, depicted in FIG. 14) may receive a discovery message including a network address of the set of network addresses.

As further shown in FIG. 10, in some aspects, the process 1000 may include providing at least part of the discovery message to the second EASDF or to an SMF of the first network (block 1030). For example, the first EASDF (such as by using transmission component 1404, depicted in FIG. 14) may provide at least part of the discovery message to the second EASDF or to an SMF of the first network.

As further shown in FIG. 10, in some aspects, the process 1000 may include receiving, from the second EASDF in accordance with the network address, access information associated with an EAS of the second network (block 1040). For example, the first EASDF (such as by using reception component 1402, depicted in FIG. 14) may obtain, from the second EASDF in accordance with the network address, access information (such as a DNAI, an IP address, or other information) associated with an EAS of the second network.

The process 1000 may include additional aspects, such as any single aspect or any combination of aspects described in connection with the process 1000 or in connection with one or more other processes described elsewhere herein.

In a first additional aspect, the process 1000 includes selecting (such as using the selection component 1408, depicted in FIG. 14), associated with the indication, the second EASDF associated with at least the second network.

In a second additional aspect, alone or in combination with the first aspect, the filtering information indicates that the set of network addresses are associated with one or more EASs belonging to the second network.

In a third additional aspect, alone or in combination with one or more of the first and second aspects, the set of network addresses identifies a set of fully qualified domain names.

In a fourth additional aspect, alone or in combination with one or more of the first through third aspects, the discovery message is a domain name service query message.

In a fifth additional aspect, alone or in combination with one or more of the first through fourth aspects, the second EASDF is associated with at least the second network based at least in part on the second EASDF having discovery information for EASs belonging to the second network.

In a sixth additional aspect, alone or in combination with one or more of the first through fifth aspects, the second EASDF is associated with the first network and with the second network.

In a seventh additional aspect, alone or in combination with one or more of the first through sixth aspects, the second EASDF is associated with only the second network and the first EASDF is associated with only the first network.

In an eighth additional aspect, alone or in combination with one or more of the first through seventh aspects, the filtering information is associated with a PLMN identifier of the second network, and where providing at least part of the discovery message to the second EASDF is based at least in part on the second EASDF being associated with the second network.

In a ninth additional aspect, alone or in combination with one or more of the first through eighth aspects, the process 1000 includes transmitting the access information and the PLMN identifier to the SMF.

Although FIG. 10 shows example blocks of the process 1000, in some aspects, the process 1000 may include additional blocks, fewer blocks, different blocks, or differently arranged blocks than those depicted in FIG. 10. Additionally, or alternatively, two or more of the blocks of the process 1000 may be performed in parallel.

FIG. 11 is a diagram illustrating an example process 1100 performed, for example, by a network entity. The process 1100 is an example where the network entity (for example, SMF 410, SMF 502, or SMF 610) performs operations associated with discovery of an EAS across networks.

As shown in FIG. 11, in some aspects, the process 1100 may include selecting a first EASDF associated with a first network, where the network entity is associated with the first network (block 1110). For example, the network entity (such as by using selection component 1308, depicted in FIG. 13) may select a first EASDF associated with a first network, where the network entity is associated with the first network.

As further shown in FIG. 11, in some aspects, the process 1100 may include receiving, from a second EASDF via the first EASDF, access information associated with an EAS of a second network, where the second EASDF is associated with the second network (block 1120). For example, the network entity (such as by using reception component 1302, depicted in FIG. 13) may receive, from a second EASDF via the first EASDF, access information associated with an EAS of a second network, where the second EASDF is associated with the second network.

As further shown in FIG. 11, in some aspects, the process 1100 may include communicating with the second network using the received access information (block 1130). For example, the network entity (such as by using transmission component 1304, depicted in FIG. 13) may communicate with the second network using the received access information. For example, the network entity may configure or establish a connection between the first network and the second network.

The process 1100 may include additional aspects, such as any single aspect or any combination of aspects described in connection with the process 1100 or in connection with one or more other processes described elsewhere herein.

In a first additional aspect, communicating with the second network using the received access information further includes configuring a connection to the second network.

In a second additional aspect, alone or in combination with the first aspect, the communicating is associated with establishing a connection between a first user plane function of the first network and a network entity of the second network.

In a third additional aspect, alone or in combination with one or more of the first and second aspects, the first user plane function is a federated user plane function associated with the connection with the EAS of the second network.

In a fourth additional aspect, alone or in combination with one or more of the first through third aspects, the network entity of the second network is a second user plane function of the second network.

In a fifth additional aspect, alone or in combination with one or more of the first through fourth aspects, the process 1100 includes transmitting, to the second user plane function based at least in part on the first user plane function of the first network being a session anchor of the connection, information indicating an Internet Protocol address of a UE associated with the connection.

In a sixth additional aspect, alone or in combination with one or more of the first through fifth aspects, the process 1100 includes receiving, from a session management function of the second network associated with the second user plane function being a session anchor of the connection, information indicating an Internet Protocol address of a UE associated with the connection.

In a seventh additional aspect, alone or in combination with one or more of the first through sixth aspects, the process 1100 includes transmitting, to the first user plane function, the information indicating the Internet Protocol address of the UE associated with the connection.

In an eighth additional aspect, alone or in combination with one or more of the first through seventh aspects, the second user plane function is a federated user plane function associated with establishment of the connection with the first user plane function of the first network.

In a ninth additional aspect, alone or in combination with one or more of the first through eighth aspects, the first user plane function is designated for communication with EASs of the second network.

In a tenth additional aspect, alone or in combination with one or more of the first through ninth aspects, the network entity of the second network is associated with an edge data network of the second network.

In an eleventh additional aspect, alone or in combination with one or more of the first through tenth aspects, the process 1100 includes configuring the first user plane function using the access information, where the first user plane function is accessible to an edge data network of the second network.

In a twelfth additional aspect, alone or in combination with one or more of the first through eleventh aspects, establishing the connection further includes communicating with a session management function of the second network to configure the connection.

Although FIG. 11 shows example blocks of the process 1100, in some aspects, the process 1100 may include additional blocks, fewer blocks, different blocks, or differently arranged blocks than those depicted in FIG. 11. Additionally, or alternatively, two or more of the blocks of the process 1100 may be performed in parallel.

Figure 12:
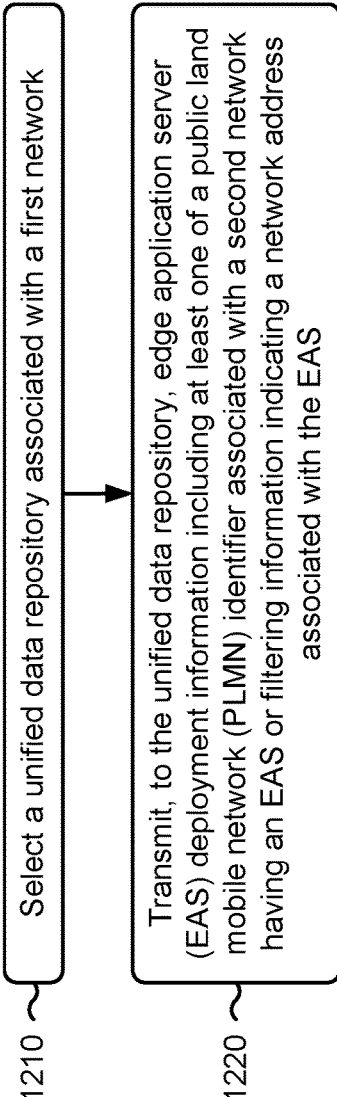
FIG. 12 is a diagram illustrating an example process performed, for example, by a network entity.

FIG. 12 is a diagram illustrating an example process 1200 performed, for example, by a network entity. The process 1200 is an example where the network entity (for example, an AF associated with an EAS, as described herein) performs operations associated with discovery of an EAS across networks.

As shown in FIG. 12, in some aspects, the process 1200 may include selecting a unified data repository associated with a first network (block 1210). For example, the network entity (such as by using selection component 1508, depicted in FIG. 15) may select a unified data repository associated with a first network.

As further shown in FIG. 12, in some aspects, the process 1200 may include transmitting, to the unified data repository, EAS deployment information including at least one of a PLMN identifier associated with a second network having an EAS or filtering information indicating a network address associated with the EAS (block 1220). For example, the network entity (such as by using transmission component 1504, depicted in FIG. 15) may transmit, to the unified data repository via a network exposure function, EAS deployment information. The EAS deployment information may include at least one of a PLMN identifier associated with a second network having an EAS, or filtering information indicating a network address associated with the EAS.

The process 1200 may include additional aspects, such as any single aspect or any combination of aspects described in connection with the process 1200 or in connection with one or more other processes described elsewhere herein.

In a first aspect, the EAS deployment information is usable by an SMF for configuring an EAS discovery function of the first network to discover the EAS or an EAS discovery function of the second network. For example, the SMF may configure an EASDF of the first network to discover the EAS of the second network, or an EASDF of the second network, using the PLMN identifier associated with the second network and the filtering information indicating the network address associated with the EAS.

Figure 13:
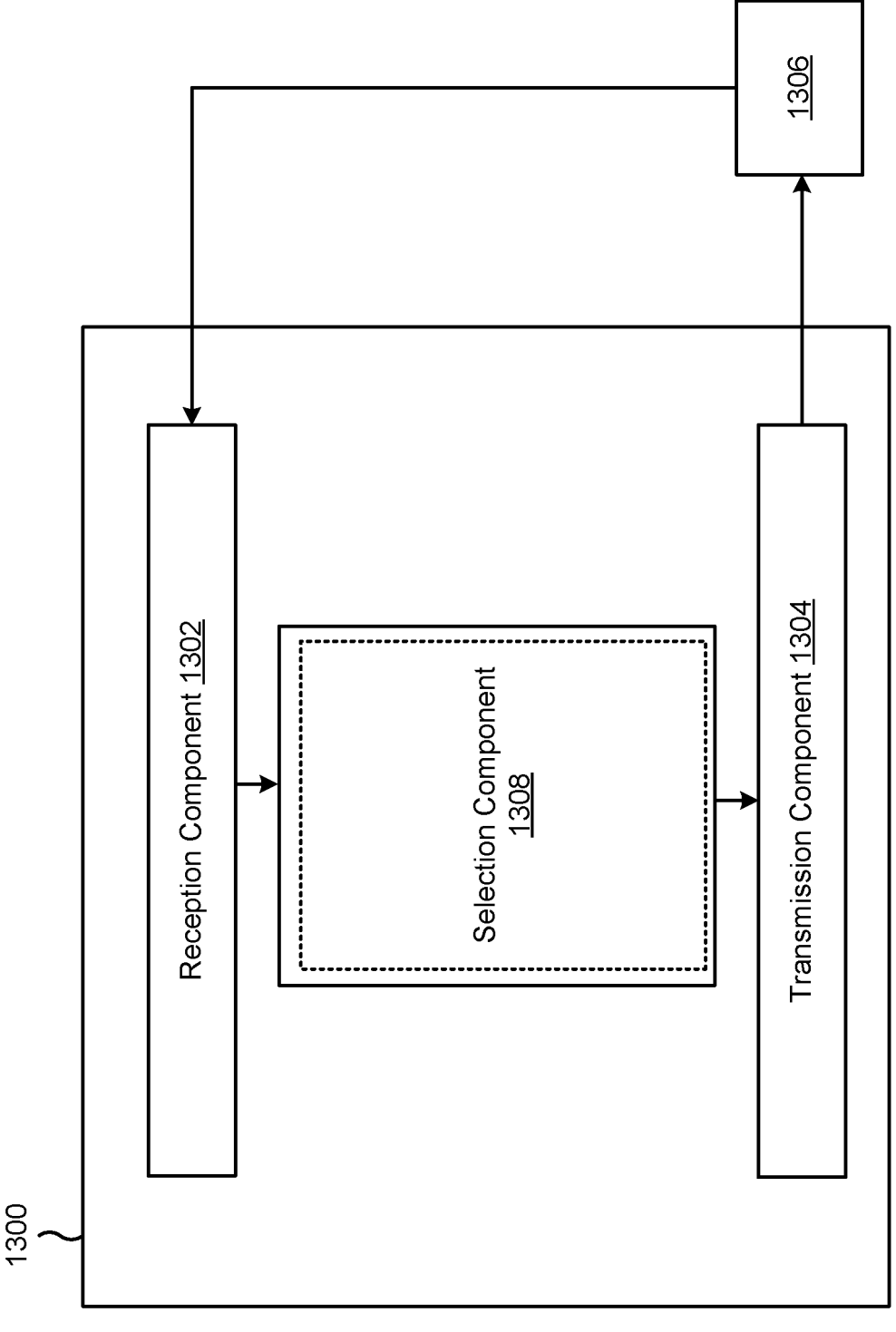
FIG. 13 is a diagram of an example apparatus for wireless communication.

Although FIG. 12 shows example blocks of the process 1200, in some aspects, the process 1200 may include additional blocks, fewer blocks, different blocks, or differently arranged blocks than those depicted in FIG. 12. Additionally, or alternatively, two or more of the blocks of the process 1200 may be performed in FIG. 13 is a diagram of an example apparatus 1300 for wireless communication. The apparatus 1300 may be a network entity, or a network entity may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another network entity) using the reception component 1302 and the transmission component 1304. As further shown, the apparatus 1300 may include a selection component 1308, among other examples.

In some aspects, the apparatus 1300 may be configured to perform one or more operations described herein in connection with FIGS. 3-8. Additionally, or alternatively, the apparatus 1300 may be configured to perform one or more processes described herein, such as process 900 of FIG. 9, process 1100 of FIG. 11, or a combination thereof. In some aspects, the apparatus 1300 or one or more components shown in FIG. 13 may include one or more components of the network entity described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network entity described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network entity described in connection with FIG. 2. In some aspects, the transmission component 1304 may be co-located with the reception component 1302 in a transceiver. In some other aspects, the transmission component 1304 and the reception component 1302 may interface with one or more radio communication components, such as a transceiver or a radio unit. In some aspects, the reception component 1302 and the transmission component 1304 may include or be included in a network interface, which may facilitate communication with other network entities.

The transmission component 1304 may provide, to a first EASDF of a first network to which the network entity belongs, filtering information indicating a set of network addresses. The reception component 1302 may receive, from the first EASDF, an indication that a discovery message, received by the first EASDF, includes a network address of the set of network addresses. The transmission component 1304 may transmit, or causing the first EASDF to transmit, at least part of the discovery message to the second EASDF. The selection component 1308 may select, in accordance with the indication, the second EASDF associated with at least the second network.

The selection component 1308 may select a first EASDF associated with a first network, where the network entity is associated with the first network. The reception component 1302 may receive, from a second EASDF via the first EASDF, access information associated with an EAS of a second network, where the second EASDF is associated with the second network. The transmission component 1304 may communicate with the second network using the received access information.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component. or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
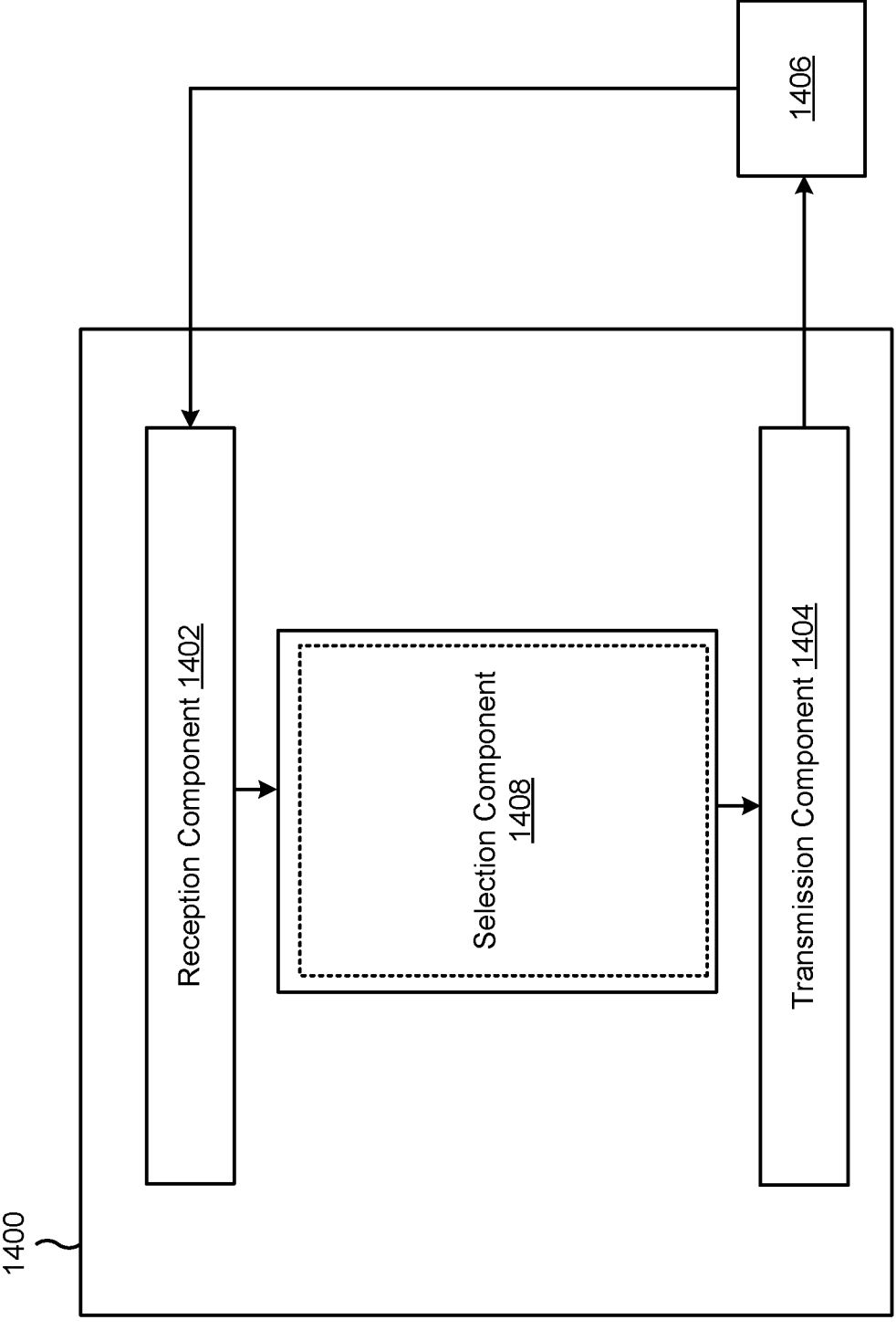
FIG. 14 is a diagram of an example apparatus for wireless communication.

FIG. 14 is a diagram of an example apparatus 1400 for wireless communication. The apparatus 1400 may be an EASDF, or an EASDF may include the apparatus 1400. In some aspects, the apparatus 1400 includes a reception component 1402 and a transmission component 1404, which may be in communication with one another (for example, via one or more buses or one or more other components). As shown, the apparatus 1400 may communicate with another apparatus 1406 (such as a UE, a base station, or another network entity) using the reception component 1402 and the transmission component 1404. As further shown, the apparatus 1400 may include a selection component 1408, among other examples.

In some aspects, the apparatus 1400 may be configured to perform one or more operations described herein in connection with FIGS. 4-8. Additionally, or alternatively, the apparatus 1400 may be configured to perform one or more processes described herein, such as process 1000 of FIG. 10, or a combination thereof. In some aspects, the apparatus 1400 or one or more components shown in FIG. 14 may include one or more components of the base station described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the base station described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the EAS described in connection with FIG. 2. In some aspects, the transmission component 1404 may be co-located with the reception component 1402 in a transceiver. In some aspects, the reception component 1402 and the transmission component 1404 may include or be included in a network interface, which may facilitate communication with other network entities.

The reception component 1402 may receive filtering information indicating a set of network addresses. The reception component 1402 may receive a discovery message including a network address of the set of network addresses. The transmission component 1404 may provide at least part of the discovery message to the second EASDF or to an SMF of the first network. The reception component 1402 may obtain, from the second EASDF in accordance with the network address, access information associated with an EAS of the second network.

The selection component 1408 may select, associated with the indication, the second EASDF associated with at least the second network.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
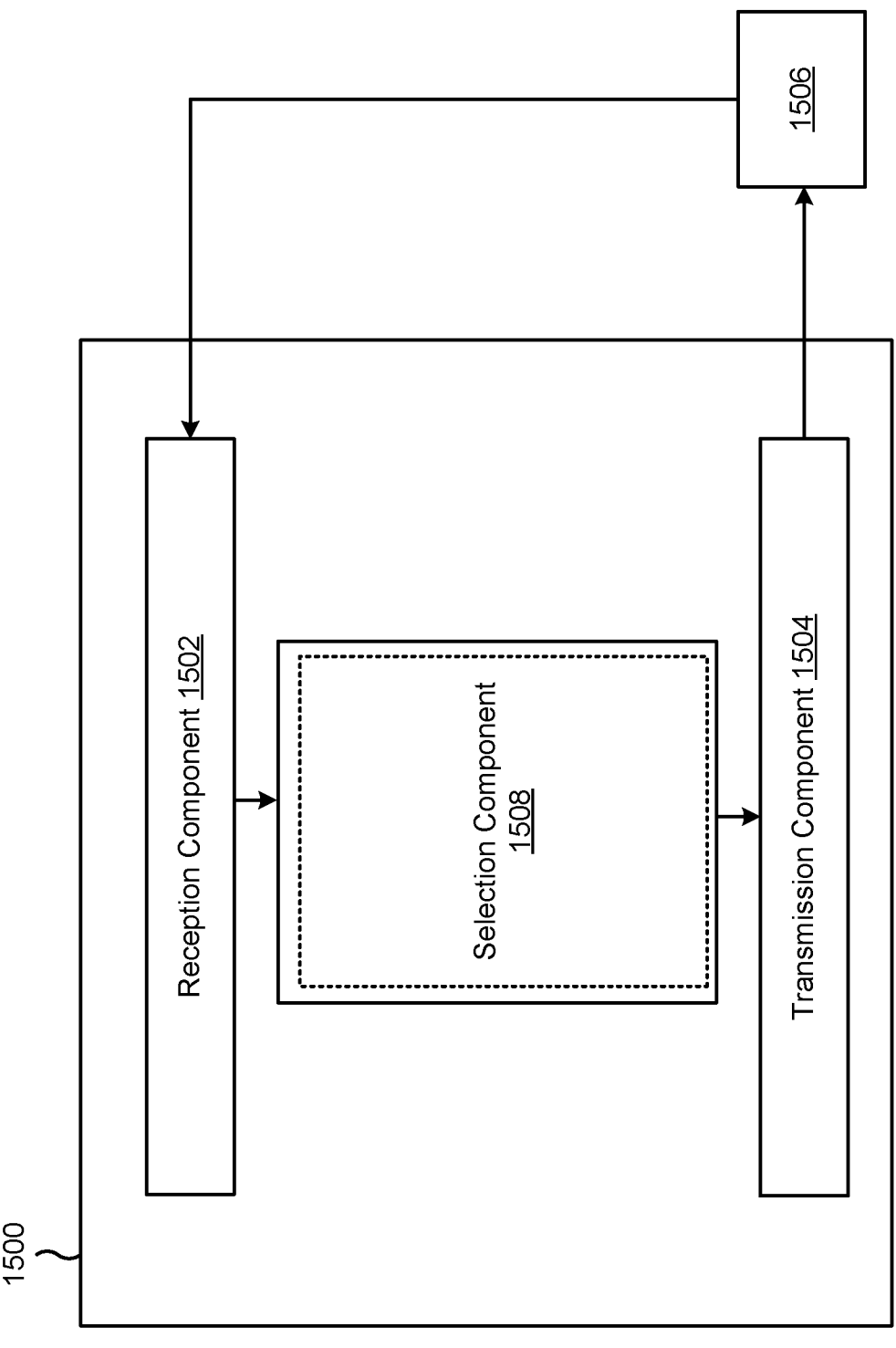
FIG. 15 is a diagram of an example apparatus for wireless communication.

FIG. 15 is a diagram of an example apparatus 1500 for wireless communication. The apparatus 1500 may be a network entity such as an AF, or a network entity may include the apparatus 1500. In some aspects, the apparatus 1500 includes a reception component 1502 and a transmission component 1504, which may be in communication with one another (for example, via one or more buses or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a selection component 1508, among other examples.

In some aspects, the apparatus 1500 may be configured to perform one or more operations described herein in connection with FIGS. 3-8. Additionally, or alternatively, the apparatus 1500 may be configured to perform one or more processes described herein, such as process 1200 of FIG. 12, or a combination thereof. In some aspects, the apparatus 1500 or one or more components shown in FIG. 15 may include one or more components of the network entity described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network entity described in connection with FIG. 2. In some aspects, the reception component 1502 may include or be included in a network interface, which may facilitate communication with other network entities.

The selection component 1508 may select a unified data repository associated with a first network. The transmission component 1504 may transmit, to the unified data repository, EAS deployment information including at least one of a PLMN identifier associated with a second network having an EAS or filtering information indicating a network address associated with the EAS.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component. or a single component shown in FIG. 15 may be implemented as multiple, distributed components. Additionally, or alternatively, a set of (one or more) components shown in FIG. 15 may perform one or more functions described as being performed by another set of components shown in FIG. 15.

The foregoing disclosure provides illustration and description but is not intended to be exhaustive or to limit the aspects to the precise forms disclosed. Modifications and variations may be made in light of the disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single-or multi-chip processor. a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware. digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium. which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A network entity for wireless communication, comprising:

a processing system that includes one or more processors and one or more code-storing memories coupled with the one or more processors, the processing system configured to cause the network entity to:

output, to a first edge application server (EAS) discovery function (EASDF) of a first network to which the network entity belongs, filtering information indicating a set of network addresses;

obtain, from the first EASDF, an indication that a discovery message, received by the first EASDF, includes a network address of the set of network addresses; and

output at least part of the discovery message to a second EASDF associated with a second network to which the network entity does not belong,
wherein the second EASDF is different from the first EASDF, and
wherein the second EASDF is a shared EASDF that facilitates discovery of EASs of the second network to which the network entity does not belong.

2. The network entity of claim 1, wherein the processing system is further configured to cause the network entity to:
select, in accordance with the indication, the second EASDF.

3. The network entity of claim 1, wherein the network address is associated with an EAS of the EASs of the second network to which the network entity does not belong.

4. The network entity of claim 1, wherein the processing system is further configured to cause the network entity to:
obtain, from the second EASDF via the first EASDF, access information associated with an EAS of the EASs of the second network to which the network entity does not belong; and
establish a connection to the second network to which the network entity does not belong based at least in part on the access information.

5. The network entity of claim 4, wherein the connection is between a first user plane function of the first network and another network entity of the second network to which the network entity does not belong.

6. The network entity of claim 5, wherein the other network entity is a second user plane function of the second network to which the network entity does not belong.

7. The network entity of claim 6, wherein the processing system is further configured to cause the network entity to:
output, to the second user plane function based at least in part on the first user plane function of the first network being a session anchor of the connection, information indicating an Internet Protocol address of a user equipment associated with the connection.

8. The network entity of claim 6, wherein the processing system is further configured to cause the network entity to:
obtain, from the second user plane function based at least in part on the second user plane function being a session anchor of the connection, information indicating an Internet Protocol address of a user equipment associated with the connection.

9. The network entity of claim 5, wherein the first user plane function is designated for communication with the EASs of the second network to which the network entity does not belong.

10. The network entity of claim 5, wherein the access information is specific to the first user plane function.

11. The network entity of claim 5, wherein the processing system is further configured to cause the network entity to:
configure the first user plane function based at least in part on the access information, wherein the first user plane function is accessible to an edge data network of the second network to which the network entity does not belong.

12. The network entity of claim 5, wherein the other network entity is associated with an edge data network of the second network to which the network entity does not belong.

13. The network entity of claim 4, wherein the processing system, to establish the connection, is configured to cause the network entity to:
communicate with a session management function of the second network, to which the network entity does not belong, to configure the connection.

14. An apparatus of a first edge application server (EAS) discovery function (EASDF) for wireless communication associated with a first network, comprising:
a processing system that includes one or more processors and one or more code-storing memories coupled with the one or more processors, the processing system configured to cause the apparatus to:
obtain, from a network entity, filtering information indicating a set of network addresses;
obtain a discovery message including a network address of the set of network addresses;
output at least part of the discovery message to a second EASDF associated with a second network to which the network entity does not belong,
wherein the second EASDF is a shared EASDF that facilitates discovery of EASs of the second network to which the network entity does not belong; and
obtain, from the second EASDF in accordance with the network address, access information associated with an EAS of the EASs of the second network to which the network entity does not belong.

15. The apparatus of claim 14, wherein the processing system is further configured to cause the apparatus to:
select, in accordance with the discovery message, the second EASDF.

16. The apparatus of claim 14, wherein the filtering information indicates that the set of network addresses are associated with one or more of the EASs of the second network to which the network entity does not belong.

17. The apparatus of claim 14, wherein the second EASDF is associated with the first network and with the second network to which the network entity does not belong.

18. The apparatus of claim 14, wherein the filtering information is associated with a public land mobile network (PLMN) identifier of the second network to which the network entity does not belong, and wherein providing at least part of the discovery message to the second EASDF is based at least in part on the second EASDF being associated with the second network to which the network entity does not belong.

19. The apparatus of claim 18, wherein the processing system is further configured to cause the apparatus to:
output the access information and the PLMN identifier to a session management function (SMF) of the first network.

20. A method of wireless communication performed by a network entity, comprising:
providing, to a first edge application server (EAS) discovery function (EASDF) of a first network to which the network entity belongs, filtering information indicating a set of network addresses;
receiving, from the first EASDF, an indication that a discovery message, received by the first EASDF, includes a network address of the set of network addresses; and
transmitting at least part of the discovery message to a second EASDF associated with at least a second network to which the network entity does not belong,
wherein the second EASDF is different from the first EASDF, and
wherein the second EASDF is a shared EASDF that facilitates discovery of EASs of the second network to which the network entity does not belong.

21. The method of claim 20, further comprising:
selecting, in accordance with the indication, the second EASDF.

22. The method of claim 20, wherein the network address is associated with an EAS of the EASs of the second network to which the network entity does not belong.

23. The method of claim 20, wherein the second EASDF is associated with a plurality of networks including the second network to which the network entity does not belong.

24. The method of claim 20, wherein the filtering information is associated with a public land mobile network (PLMN) identifier of the second network to which the network entity does not belong, and wherein providing at least part of the discovery message to the second EASDF further comprises providing at least part of the discovery message to the second EASDF based at least in part on the second EASDF being associated with the second network to which the network entity does not belong.

25. The method of claim 20, further comprising:
obtaining EAS deployment information indicating the filtering information from a network exposure function (NEF) of the first network.

26. A method of wireless communication performed by a first edge application server (EAS) discovery function (EASDF) associated with a first network, comprising:
receiving, from a network entity, filtering information indicating a set of network addresses;
receiving a discovery message including a network address of the set of network addresses;
providing at least part of the discovery message to a second EASDF associated with a second network to which the network entity does not belong, wherein the second EASDF is a shared EASDF that facilitates discovery of EASs belonging toof the second network to which the network entity does not belong; and
obtaining, from the second EASDF in accordance with the network address, access information associated with an EAS of the EASs of the second network to which the network entity does not belong.

27. The method of claim 26, wherein the discovery message is a domain name service query message.

28. The network entity of claim 1, wherein the processing system is further configured to cause the network entity to:
select the second EASDF based at least in part on the second EASDF being associated with a public land mobile network (PLMN) identifier indicated by a domain name system (DNS) query associated with the second network to which the network entity does not belong.

29. The apparatus of claim 14, wherein the processing system is further configured to cause the apparatus to:
select the second EASDF based at least in part on the second EASDF being associated with a public land mobile network (PLMN) identifier indicated by a domain name system (DNS) query associated with the second network to which the network entity does not belong.

30. The apparatus of claim 14, wherein the discovery message is a domain name system (DNS) query.

* * * * *